US010893650B1

(12) United States Patent
Sims et al.

(10) Patent No.: US 10,893,650 B1
(45) Date of Patent: Jan. 19, 2021

(54) SYSTEMS AND METHODS FOR CONTROLLING CENTER PIVOT IRRIGATION SYSTEMS

(71) Applicant: Orbit Irrigation Products, LLC, North Salt Lake, UT (US)

(72) Inventors: Jason R. Sims, New Braunfels, TX (US); James G. Stewart, II, Springville, UT (US); Brad J. Wardle, Kaysville, UT (US)

(73) Assignee: Orbit Irrigation Products, LLC, North Salt Lake, UT (US)

( * ) Notice: Subject to any disclaimer, the term of this patent is extended or adjusted under 35 U.S.C. 154(b) by 0 days.

(21) Appl. No.: 16/183,235

(22) Filed: Nov. 7, 2018

Related U.S. Application Data

(60) Provisional application No. 62/582,936, filed on Nov. 7, 2017.

(51) Int. Cl.
| | | |
|---|---|---|
| *A01G 25/16* | (2006.01) | |
| *A01C 23/00* | (2006.01) | |
| *G05B 19/042* | (2006.01) | |
| *A01M 7/00* | (2006.01) | |
| *A01M 21/04* | (2006.01) | |
| *A01G 25/09* | (2006.01) | |

(52) U.S. Cl.
CPC ............ *A01G 25/16* (2013.01); *A01C 23/007* (2013.01); *A01G 25/092* (2013.01); *G05B 19/042* (2013.01); *A01M 7/0092* (2013.01); *A01M 21/043* (2013.01); *G05B 2219/2625* (2013.01)

(58) Field of Classification Search
CPC .... A01G 25/16; A01G 25/092; A01C 23/007; G05B 19/042; G05B 2219/2625; A01M 7/0092; A01M 21/043
See application file for complete search history.

(56) References Cited

U.S. PATENT DOCUMENTS 5,740,038 A * 4/1998 Hergert ............... A01G 25/092
700/284
7,953,550 B1 * 5/2011 Weiting ............... A01G 25/092
239/727

(Continued)

OTHER PUBLICATIONS

U.S. Appl. No. 16/183,089, filed Nov. 7, 2018, Sims.

(Continued)

*Primary Examiner* — Chad G Erdman
(74) *Attorney, Agent, or Firm* — Austin Rapp

(57) ABSTRACT

An electronic device is described, including memory and a processor coupled to the memory. The processor is configured to receive center pivot irrigation system information corresponding to a center pivot irrigation system and to request map data. The processor is also configured to a user interface with a map of the center pivot irrigation system. The processor is further configured to receive an input via the user interface indicating an input point. The processor is additionally configured to render an alteration point marker at a first position, the alteration point marker representing an alteration point for the pivot, the alteration point corresponding to a first radial position of the pivot at which a change in operation of the pivot is set to occur. The processor is also configured to control the center pivot irrigation system to alter operation of the pivot at the first radial position.

19 Claims, 34 Drawing Sheets

(56) References Cited

U.S. PATENT DOCUMENTS

| | | | |
|---|---|---|---|
| 9,298,861 B1* | 3/2016 | Lammers | G06F 17/5009 |
| 2003/0220734 A1 | 11/2003 | Harrison | |
| 2013/0226356 A1 | 8/2013 | Pfrenger | |
| 2014/0110498 A1* | 4/2014 | Nelson | B05B 15/70 |
| | | | 239/69 |
| 2016/0029545 A1* | 2/2016 | Matthews | G06K 9/00476 |
| | | | 701/28 |
| 2016/0267203 A1 | 9/2016 | Christensen | |
| 2018/0054982 A1* | 3/2018 | Whalley | A01G 25/092 |

OTHER PUBLICATIONS

Agsense, LLC, WagNet User Guide (images 1-95, You Tube video [Online], published Jan. 6, 2017, Retrieved from the Internet on Nov. 13, 2018: <URL: https://www.youtube.com/watch?v=2WHuyRtL-Iw> (shown in attachment 1, Parts 1-6).

Office Action, U.S. Appl. No. 16/183,089, dated Feb. 21, 2020 (shown in attachment 7).

Office Action Response, U.S. Appl. No. 16/183,089, filed Aug. 21, 2020 (shown in attachment 8).

Supplemental Office Action Response, U.S. Appl. No. 16/183,089, filed Sep. 25, 2020 (shown in attachment 9).

\* cited by examiner

SYSTEMS AND METHODS FOR CONTROLLING CENTER PIVOT IRRIGATION SYSTEMS

RELATED APPLICATION

This application is related to and claims priority to U.S. Provisional Patent Application Ser. No. 62/582,936, filed Nov. 7, 2017, for "SYSTEMS AND METHODS FOR CONTROLLING A CENTER PIVOT IRRIGATION SYSTEM," which is hereby expressly incorporated by reference in its entirety.

TECHNICAL FIELD

The present disclosure relates generally to irrigation systems. More specifically, the present disclosure relates to systems and methods for controlling a center pivot irrigation system.

BACKGROUND

Irrigation systems have been implemented to deliver fluid (e.g., pressurized water). Small-scale and large-scale irrigation systems have been used. For example, irrigation systems may be used to water small lawns or large-scale farming plots. Improvements to irrigation systems are desirable.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings, in which:

Figure 1:
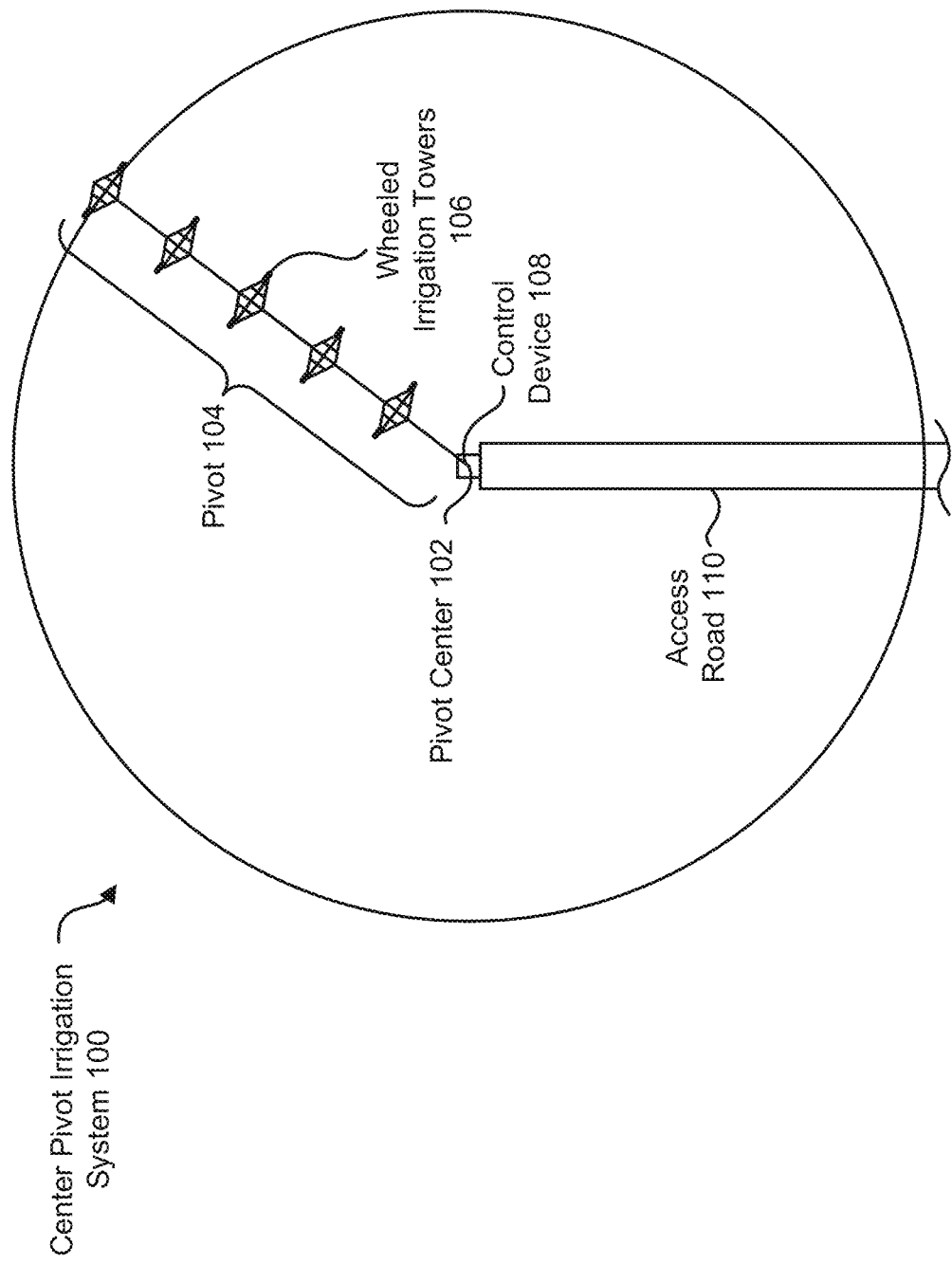
FIG. 1 is a diagram illustrating an example of a center pivot irrigation system.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

An electronic device is disclosed. The device may include memory and at least one processor coupled to the memory. The at least one processor may be configured to receive center pivot irrigation system information corresponding to a center pivot irrigation system. The center pivot irrigation system may comprise a pivot center and a pivot. The pivot may extend from the pivot center and may comprise a plurality of irrigation sprinklers coupled to an irrigation line. The pivot may be configured to rotate about the pivot center through different radial positions relative to the pivot center.

The at least one processor may be configured to request map data based on the center pivot irrigation system information. The map data may comprise one or more images including a location of the center pivot irrigation system. The at least one processor may also be configured to receive the map data. The at least one processor may be configured to present a user interface with a map of the center pivot irrigation system based on the map data. The at least one processor may also be configured to receive an input via the user interface indicating an input point on the map of the user interface. The at least one processor may be further configured to render, on the map of the user interface, an alteration point marker at a first position aligned with the input point and a pivot center location. The alteration point marker may represent an alteration point for the pivot. The alteration point may correspond to a first radial position of the pivot at which a change in operation of the pivot is set to occur. The first position of the alteration point marker may correspond to the first radial position of the pivot. The at least one processor may also be configured to control the center pivot irrigation system to alter operation of the pivot at the first radial position.

The at least one processor may be further configured to render a fine position control on the user interface, receive an adjustment input corresponding to the fine position control, and adjust the alteration point based on the adjustment input.

The at least one processor may also be configured to determine a first coordinate of the input point on the map, and calculate the first radial position based on the first coordinate and a second coordinate of the pivot center location.

The at least one processor may also be configured to receive an operation input indicating the change in operation via the user interface, and associate the alteration point with the change in operation. The at least one processor may be configured to control the center pivot irrigation system by commanding the center pivot irrigation system to execute the change in operation based on the alteration point.

The at least one processor may be configured to receive a second input via the user interface indicating a second input point on the map of the user interface, and determine a second alteration point based on the second input point and the center pivot irrigation system information.

The at least one processor may be configured to control the center pivot irrigation system by commanding the center pivot irrigation system to execute the change in operation in a range between the alteration point and the second alteration point.

The alteration point may correspond to an access road. In such an embodiment, the at least one processor may be configured to control the center pivot irrigation system by commanding the center pivot irrigation system to stop the pivot at the first radial position based on the alteration input.

The at least one processor may also be configured to alter operation of the pivot at the first radial position by commanding the center pivot irrigation system to stop moving, to start moving, to activate an end gun, to deactivate an end gun, to change speed, to change direction, to supply auxiliary material, to stop supplying auxiliary material, to change auxiliary material supply, to activate liquid flow, or to deactivate liquid flow at the first radial position.

A non-transitory computer-readable medium for storing computer executable code is also disclosed. The non-transitory computer-readable medium may comprise code for causing an electronic device to receive center pivot irrigation system information from a center pivot irrigation system. The center pivot irrigation system may comprise a pivot center and a pivot. The pivot may extend from the pivot center and may comprise a plurality of irrigation sprinklers coupled to an irrigation line. The pivot may be configured to rotate through different radial positions relative to the pivot center. The non-transitory computer-readable medium may comprise code for causing the electronic device to request map data based on the center pivot irrigation system information. The map data may comprise one or more images including a location of the center pivot irrigation system. The non-transitory computer-readable medium may comprise code for causing the electronic device to receive the map data. The non-transitory computer-readable medium may also comprise code for causing the electronic device to present a user interface with a map of the center pivot irrigation system based on the map data. The non-transitory computer-readable medium may comprise code for causing the electronic device to receive an input via the user interface indicating an input point on the map of the user interface. The non-transitory computer-readable medium may comprise code for causing the electronic device to render, on the map of the user interface, an alteration point marker at a first position aligned with the input point and a location of the pivot center. The alteration point marker may represent an alteration point for the pivot. The alteration point may correspond to a first radial position of the pivot at which a change in operation of the pivot is set to occur. The first position of the alteration point marker may correspond to the first radial position of the pivot. The non-transitory computer-readable medium may comprise code for causing the electronic device to control the center pivot irrigation system to alter operation of the pivot at the first radial position.

The non-transitory computer-readable medium may further comprise code for causing the electronic device to render a fine position control in the user interface, code for causing the electronic device to receive an adjustment input corresponding to the fine position control, and code for causing the electronic device to adjust the alteration point based on the adjustment input. The non-transitory computer-readable medium may further comprise code for causing the electronic device to determine a first coordinate of the input point on the map, and code for causing the electronic device to calculate the first radial position based on the first coordinate and a second coordinate of the pivot center location.

The non-transitory computer-readable medium may further comprise code for causing the electronic device to receive an operation input indicating the change in operation via the user interface, and code for causing the electronic device to associate the alteration point with the change in operation.

The non-transitory computer-readable medium may further comprise code for causing the electronic device to control the center pivot irrigation system by commanding the center pivot irrigation system to execute the change in operation based on the alteration point.

The non-transitory computer-readable medium may also comprise code for causing the electronic device to render, on the map of the user interface, an indicator of a pivot angle of the center pivot irrigation system based on the center pivot irrigation system information.

Another non-transitory computer-readable medium storing computer executable code is also disclosed. The non-transitory computer-readable medium may comprise code for causing an electronic device to receive center pivot irrigation system information from a first server. A center pivot irrigation system may comprise a pivot center and a pivot. The pivot may extend from the pivot center and may comprise a plurality of irrigation sprinklers coupled to an irrigation line. The pivot may be configured to rotate through different radial positions relative to the pivot center. The non-transitory computer-readable medium may comprise code for causing the electronic device to request map data from a second server based on the center pivot irrigation system information. The map data may comprise one or more images including a location of the center pivot irrigation system. The non-transitory computer-readable medium may comprise code for causing the electronic device to receive the map data from the second server. The non-transitory computer-readable medium may also comprise code for causing the electronic device to present, on a display, a user interface with a map of the center pivot irrigation system based on the map data. The non-transitory computer-readable medium may also comprise code for causing the electronic device to render, on the display, an indicator of a current radial position of the pivot on the map of the user interface. The non-transitory computer-readable medium may further comprise code for causing the electronic device to receive, via the user interface, an operation input indicating a change in operation. The non-transitory computer-readable medium may also comprise code for causing the electronic device to receive an input via the user interface indicating an input point on the map of the user interface. The non-transitory computer-readable medium may also comprise code for causing the electronic device to render, on the map of the user interface, an alteration point marker at a first position aligned with the input point and a location of the pivot center. The alteration point marker may represent an alteration point for the pivot. The alteration point may correspond to a first radial position of the pivot at which the change in operation of the pivot is set to occur, the first position of the alteration point marker corresponding to the first radial position of the pivot. The non-transitory computer-readable medium may also comprise code for causing the electronic device to build a command table based on the change in operation and the alteration point, and code for causing the electronic device to control the center pivot irrigation system based on the command table.

The non-transitory computer-readable medium may further comprise code for causing the electronic device to render a fine position control in the user interface; code for causing the electronic device to receive an adjustment input corresponding to the fine position control; and code for causing the electronic device to adjust the alteration point based on the adjustment input.

The non-transitory computer-readable medium may further comprise code for causing the electronic device to receive a second input via the user interface indicating a second input point on the map of the user interface; code for causing the electronic device to render, on the display, an arc between the alteration point marker and a second alteration point marker at a second position aligned with the second input point and the location of the pivot center. The arc may indicate a range of the change in operation.

The non-transitory computer-readable medium may further comprise code for causing the electronic device to render, on the display, a plurality of color-coded arcs corresponding to a plurality of center pivot irrigation system operations.

The non-transitory computer-readable medium may also comprise code for causing the electronic device to display a set of thumbnail icons corresponding to a set of center pivot irrigation systems including the center pivot irrigation system; and code for causing the electronic device to receive a selection input selecting the center pivot irrigation system. The code for causing the electronic device to present the user interface with the map of the center pivot irrigation system based on the map data may be based on the selection input.

Various embodiments are now described with reference to the figures, in which like reference numbers may indicate functionally similar elements. The systems and methods as generally described and illustrated in the figures herein could be arranged and designed in a wide variety of different embodiments. Thus, the following more detailed description of several embodiments, as represented in the Figures, is not intended to limit scope, as claimed, but is merely representative of the systems and methods.

As used herein, the term "plurality" may indicate two or more. For example, a plurality of components may refer to two or more components. As used here, the term "couple" and variations thereof may denote a direct or indirect connection. For example, if a first component is coupled to a second component, then the first component may be directly connected to the second component (with one or more wires, for example) or may be indirectly connected to the second component through one or more other components. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

FIG. 1 is a diagram illustrating an example of a center pivot irrigation system 100. The center pivot irrigation system 100 may include a pivot center 102 and a plurality of wheeled irrigation towers 106. Irrigation pipe may be mounted between the pivot center 102 and a wheeled irrigation tower 106, and between wheeled irrigation towers 106. The pivot 104 may be configured to rotate about the pivot center 102 through different radial positions relative to the pivot center 102. As used herein, a "radial position" denotes a position relative to a center of a circular shape or pivot center 102. A radial position may be expressed in one or more quantities. An example of a radial position is an angle relative to a direction (e.g., north, south, east, west, or an arbitrary direction) from the center (e.g., pivot center 102). Other examples of radial positions include coordinates (e.g., latitude and longitude, World Geodetic System (WGS) coordinates, Global Positioning System (GPS) coordinates, GPS coordinates with Wide Area Augmentation System (WAAS) correction, Earth-centered Earth-fixed (ECEF) coordinates, and/or east, north, up (ENU) coordinates) and vectors. Each of the wheeled irrigation towers 106 may comprise wheels that allow the pivot 104 to rotate around the pivot center 102 to different radial positions. The wheels may be driven with electrical motors.

The pivot 104 may include irrigation sprinklers coupled to one or more irrigation lines (e.g., irrigation pipe). For example, irrigation sprinklers may be coupled to the irrigation pipe in order to deliver pressurized fluid (e.g., water, fertilizer, and/or pesticide). The irrigation pipe may be supported by trusses. While five wheeled irrigation towers 106 are illustrated in the example in FIG. 1, it should be noted that different numbers of wheeled irrigation towers 106 may be utilized in a center pivot irrigation system 100. The irrigation pipe(s), wheeled irrigation towers 106, sprinklers, and/or trusses may be referred to as the pivot 104. In addition, it should be noted that intervening irrigation pipe(s) and optional trusses may be referred to as spans.

Figure 10:
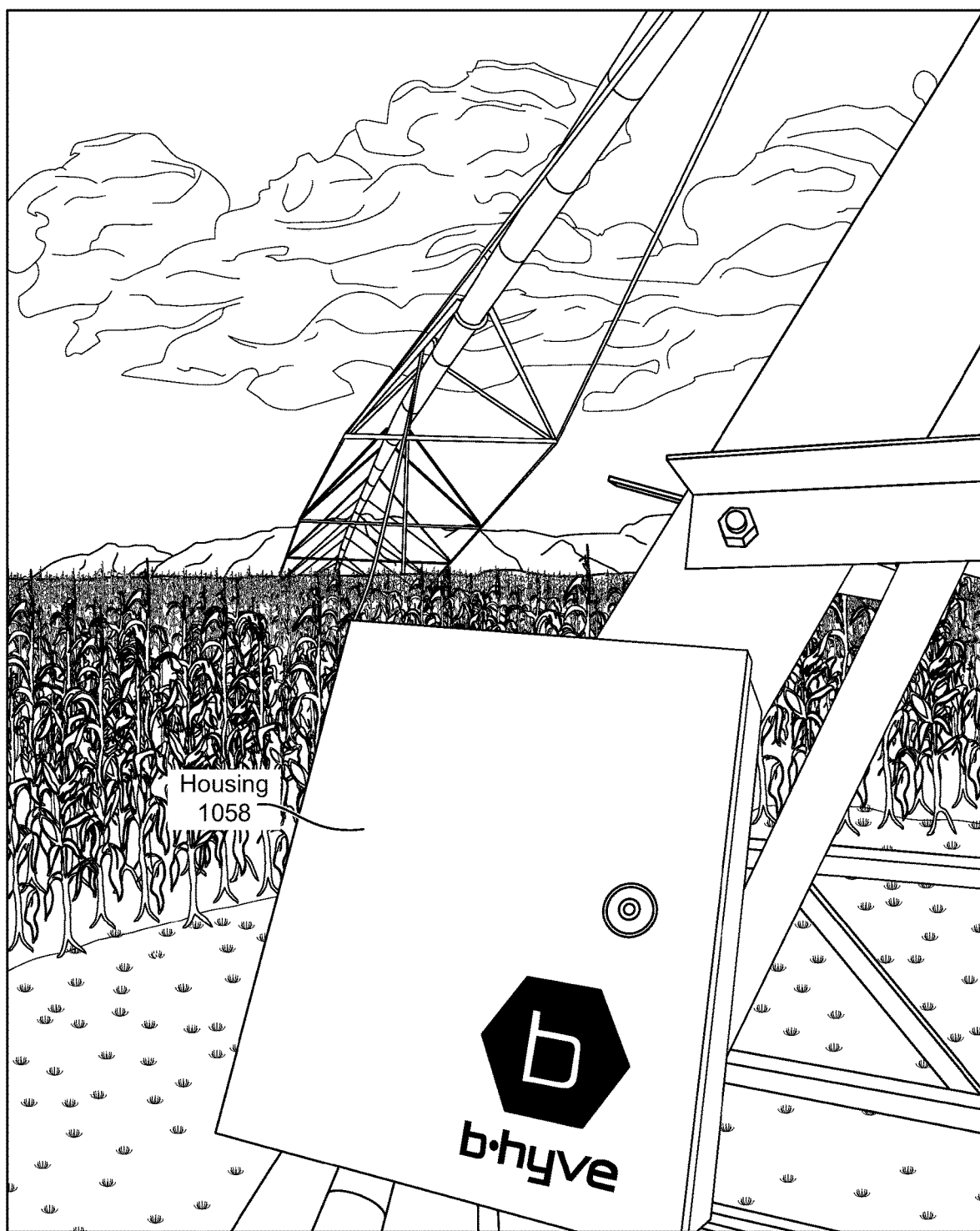
FIG. 10 is a drawing illustrating an example of a housing of a center pivot irrigation system in which a control device may be housed.

The center pivot irrigation system 100 may include a control device 108. In various embodiments, the control device 108 may be situated near the pivot center 102. For example, the control device 108 may be housed in a box mounted to a structure at the pivot center 102. FIG. 10 illustrates an example of a box that may house the control device 108. Examples of the control device 108 may include electronic circuits, integrated circuits, circuits with discrete components (e.g., resistors, capacitors, transistors, metal-oxide-semiconductor field-effect transistors (MOSFETs), etc.), application-specific integrated circuits (ASICs), computers, and/or devices that include one or more processors, memory cells, latches, logic gates, etc. For instance, the control device 108 may include discrete components and/or a processor (e.g., microprocessor) that may be used to control the center pivot irrigation system 100 and/or communicate information. In various embodiments, the processor may include and/or access software in memory and/or firmware. For example, the control device 108 may include memory. The memory may be included on-board the processor or may be separate from the processor. The memory may store instructions and/or data (e.g., information). Additionally or alternatively, the memory or a separate memory may store firmware.

The control device 108 may perform one or more functions for the center pivot irrigation system 100. For example, the control device 108 may control pivot 104 activation (e.g., whether the pivot 104 is moving), pivot 104 movement direction (e.g., motorized wheel direction, forward or reverse), pivot movement speed (e.g., a percentage between no motion and maximum speed, speed in miles per hour (mph), and/or kilometers per hour (kph), etc.), whether pressurized fluid is being delivered (e.g., whether a fluid pump is activated or deactivated), flow of pressurized fluid (e.g., fluid pressure, pressure in pounds per square inch (PSI)), whether auxiliary fluid (e.g., fertilizer, weed killer and/or pesticide) is being delivered (e.g., whether an auxiliary pump is activated or deactivated), and/or pivot radial position, etc. For example, the control device 108 may control one or more electronic switches and/or settings in order to control the one or more functions of the center pivot irrigation system 100.

In various embodiments, the control device 108 may determine and/or maintain center pivot irrigation system information (which may be referred to as "information" in some cases herein). For example, the center pivot irrigation system information may include information regarding pivot activation, pivot movement direction, pivot movement speed, whether pressurized fluid is being delivered, flow of pressurized fluid, whether auxiliary material (e.g., a fertilized or a pesticide) is being delivered, and/or pivot position (e.g., pivot angle, pivot vector, radial position of the pivot, and/or pivot coordinates), pivot center location (e.g., coordinates), etc. In some implementations, the pivot 104 may include a position sensing device (e.g., Global Positioning System (GPS)) situated at or near the remote end of the pivot 104 (e.g., boom). The position sensing device may provide position information to the control device 108 (and/or to one or more remote devices) for determining the radial position of the pivot 104. The position of the pivot center 102 may be predetermined and/or determined. For example, the control device 108 may include another positioning device (e.g., a GPS) and/or the pivot center 102 location may be predetermined (e.g., determined at the time of installation). The radial position of the pivot 104 (e.g., a line or vector from the pivot center 102 to the end of the pivot 104, a coordinate of the pivot 104, an angle of the pivot 104 relative to a direction) may be determined relative to the pivot center 102 location. For example, the control device 108 may determine an angle of the pivot 104 relative to north. For instance, the control device 108 may provide coordinates (e.g., latitude and longitude) of the pivot center 102 and coordinates (e.g., latitude and longitude) of the end of the pivot 104 to a function that returns a bearing (e.g., angle of the pivot 104) relative to a direction (e.g., north) when executed. In another approach, the pivot center 102 location may be determined using a positioning device at the end of the pivot 104. For example, the pivot center 102 may be determined as the center of a circle formed by the rotating pivot 104. In various embodiments, the radial position of the pivot 104 may be determined based on one or more other sensors that may determine a mechanical position of the pivot 104 relative to the pivot center 102.

In various embodiments, the control device 108 may send all or a portion of the center pivot irrigation system information. For example, the control device 108 may send all or a portion of the center pivot irrigation system information using a wired and/or wireless link to one or more remote devices. For instance, the control device 108 may send a signal to another device indicating the information. The signal may be communicated using a wired and/or wireless link. For example, the signal may be communicated using a mesh network, Wi-Fi network, cellular network, Ethernet network, and/or one or more other wired and/or wireless networks. In various embodiments, the data may be communicated to a server, computer, smartphone tablet device, vehicle, and/or other device. In some examples, the data may be provided to a server, which may send the data to one or more remote devices (e.g., smartphones, tablets, etc.). One or more devices may notify one or more users of the information. For example, one or more devices may present all or part of the information on a display.

The control device 108 may receive one or more instructions from one or more remote devices. For example, the control device 108 may receive instructions regarding pivot activation, pivot movement direction, pivot movement speed, whether pressurized fluid is being delivered, flow of pressurized fluid, auxiliary fluid delivery, and/or pivot position, etc.

In the example illustrated in FIG. 1, an access road 110 allows access to the pivot center 102 through a field. For instance, the access road 110 may be a road or path where crops are not cultivated, allowing a person or vehicle to pass through the field to the pivot center 102. It may be beneficial to remotely control the center pivot irrigation system 100 in order to move the pivot 104 onto the access road 110. This may allow for maintenance of the pivot 104 and/or may remove the obstruction of the pivot 104 during harvesting or other operations. In various embodiments, the center pivot irrigation system 100 may be remotely controlled to move the pivot 104 onto the access road 110 and/or other position. For example, a remote device may instruct the control device 108 to move the pivot 104 to a radial position and stop the pivot 104 at that radial position. For instance, moving the pivot 104 to a specific radial position (e.g., access road position) may be referred to as "stop-in-slot" (SIS). It should be noted that although the access road 110 is given in the example of FIG. 1, some examples of center pivot irrigation systems 100 may not be situated with an access road. A "stop-in-slot" position, if the position corresponds to a road, may enable, for example, easy access to the pivot 104 for maintenance purposes.

Figure 2:
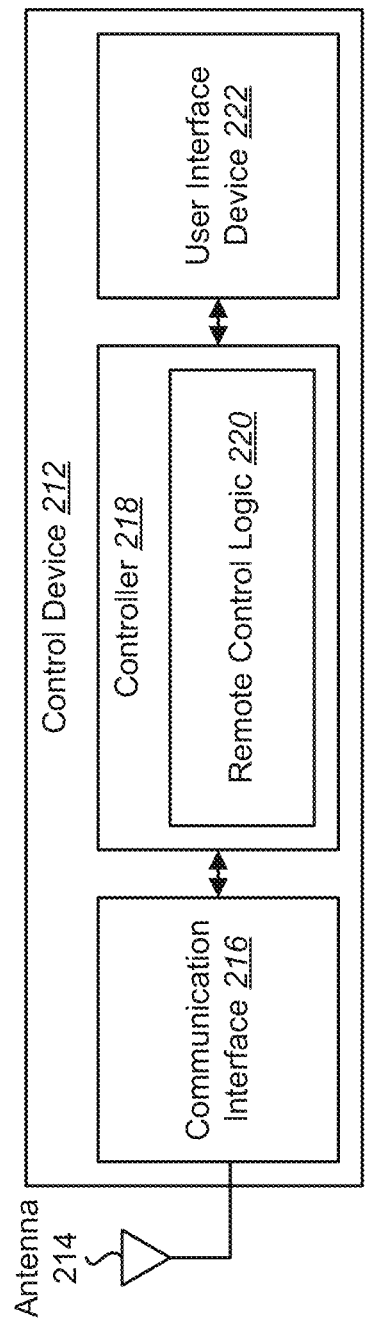
FIG. 2 is a block diagram illustrating one example of a control device.

FIG. 2 is a block diagram illustrating one example of a control device 212. The control device 212 described in connection with FIG. 2 may be an example of the control device 212 described in connection with FIG. 1. In various embodiments, the control device 212 may include a controller 218, a communication interface 216, and/or a user interface device 222.

The controller 218 may control a center pivot irrigation system. As described in connection with FIG. 1, the controller 218 may control one or more functions for the center pivot irrigation system. For example, the controller 218 may control pivot activation, pivot movement direction, pivot movement speed, whether pressurized fluid is being delivered, flow of pressurized fluid, whether auxiliary fluid, and/or pivot position, etc. For example, the controller 218 may control one or more electronic switches and/or settings in order to control the one or more functions of the center pivot irrigation system.

In various embodiments, the control device 212 may determine and/or maintain center pivot irrigation system information as described in connection with FIG. 1. For example, the center pivot irrigation system information may include information regarding pivot activation, pivot movement direction, pivot movement speed, whether pressurized fluid is being delivered, flow of pressurized fluid, whether auxiliary fluid is being delivered, and/or pivot position, etc. In some implementations, the pivot may include a position sensing device situated at or near the end of the pivot. The position sensing device may provide position information to the control device 212 (and/or to one or more remote devices) for determining the pivot position. The location of the pivot center may be predetermined or determined as described herein. For example, the control device 212 may include another positioning device, allowing the radial position of the pivot (e.g., angle of the pivot from the pivot center relative to a direction) to be determined.

The communication interface 216 may enable the control device 212 to communicate with one or more other devices (e.g., remote devices). The communication interface 216 may provide wired and/or wireless communication. For example, the communication interface 216 may include one or more components for wireless communication (e.g., power amplifier, low-noise amplifier, modem, encoder, decoder, upconverter, and/or downconverter). In various embodiments, the communication interface 216 may be coupled to one or more antennas 214. The antenna(s) 214 may be utilized to radiate electromagnetic signals representing sent data (e.g., center pivot irrigation system information). Additionally or alternatively, the antenna(s) 214 may be utilized to receive electromagnetic signals representing received data (e.g., instructions). Additionally or alternatively, the communication interface 216 may include one or more components for wired communication (e.g., port(s), amplifier, signal formatter, and/or signal deformatter). For example, the communication interface 216 may transmit one or more electrical signals on one or more wires and/or receive one or more electrical signals on one or more wires (e.g., Ethernet cable, universal serial bus (USB) cable, phone cable). Accordingly, the signal(s) may be communicated using a wired and/or wireless link. For example, the signal may be communicated using a mesh network, Wi-Fi network, cellular network, wide-area network, Ethernet network, and/or one or more other wired and/or wireless networks. In various embodiments, the data may be communicated to a server, computer, smartphone, tablet device, vehicle, and/or other device.

The communication interface 216 may send all or a portion of the center pivot irrigation system information. For example, the communication interface 216 may send all or a portion of the center pivot irrigation system information using a wired and/or wireless link to one or more remote devices. For instance, the communication interface 216 may send a signal to another device indicating the information. One or more devices may notify one or more users of the information. For example, one or more devices may present all or part of the information on a display.

The communication interface 216 may receive one or more instructions from one or more remote devices. For example, the communication interface 216 may receive instructions regarding pivot activation, pivot movement direction, pivot movement speed, whether to deliver pressurized fluid, flow of pressurized fluid, auxiliary fluid delivery, and/or pivot position, etc. The controller 218 may receive the instruction(s) from the communication interface 216.

The controller 218 may include remote control logic 220. The remote control logic 220 may enable a remote device to control the center pivot irrigation system. For example, the remote control logic 220 may utilize the received instruction(s) to control the center pivot irrigation system. For example, the controller 218 may execute the received instruction(s) as dictated by the remote control logic 220. In various embodiments, the remote control logic 220 may control one or more switches and/or settings based on the received instruction(s). For example, the remote control logic 220 may activate or deactivate pivot motion, may control pivot movement direction, control pivot movement speed, activate or deactivate a fluid pump, increase or decrease fluid pressure, activate or deactivate an auxiliary pump, and/or move the pivot position to an instructed angle, etc. For example, if an instruction to move the pivot to a particular radial position is received, the remote control logic 220 may move the pivot to that radial position. The remote control logic 220 may determine when the pivot has arrived at the radial position and may deactivate pivot movement. In some examples, the radial position may correspond to an access road. Accordingly, the remote control logic 220 may control the pivot to move until the pivot is situated at or by the access road and then may deactivate motion. For example, the communication interface 216 may receive position information from a position sensor at the end of the pivot. The position information may be provided to the controller 218 (e.g., remote control logic 220). When the position information indicates that the pivot has arrived at an instructed radial position (e.g., angle, coordinate), the remote control logic 220 may deactivate pivot motion.

In various embodiments, the controller 218 may receive (via the communication interface 216, for example) alteration point information from a remote device. For example, the alteration point information may be a point (relative to a user interface, circular shape, and/or map, for instance) corresponding to a radial position at which a change in operation of the pivot is set to occur. In some approaches, the controller 218 may transform the alteration point (relative to a circular shape and/or map, for example) to a (real-world) radial position for the pivot. The controller 218 may then implement the change in operation when the pivot reaches the radial position.

In various embodiments, the control device 212 may include a user interface device 222. For example, the user interface device 222 may be a panel including one or more interface means, such as buttons, knobs, switches, touch screens, displays, etc. The user interface device 222 may be utilized to receive user input and/or to control the center pivot irrigation system locally.

Figure 3:
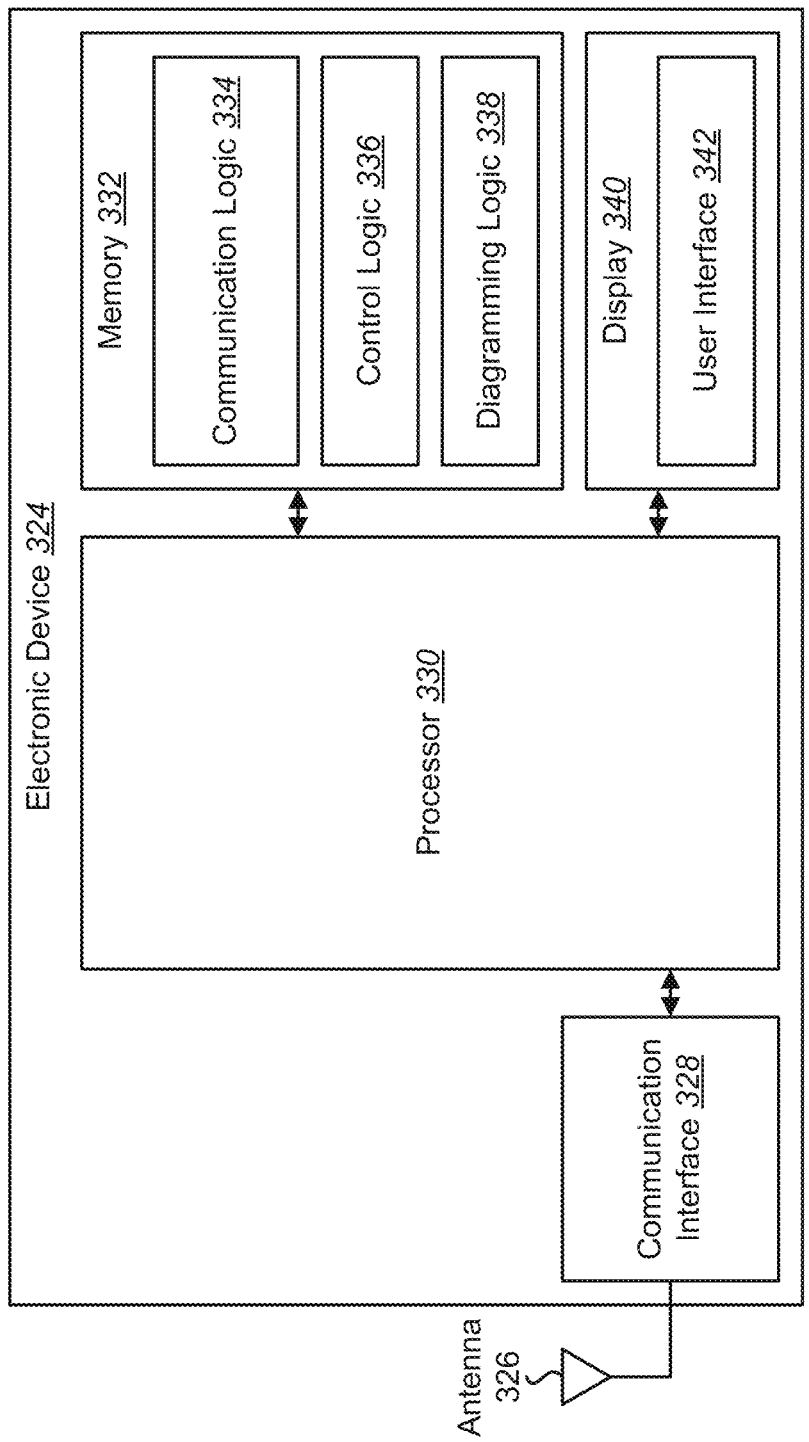
FIG. 3 is a block diagram illustrating one example of an electronic device.

FIG. 3 is a block diagram illustrating one example of an electronic device 324. The electronic device 324 described in connection with FIG. 3 may be an example of the remote device described in connection with one or more of FIGS. 1-2. Examples of the electronic device 324 may include a smartphone, tablet device, desktop computer, laptop computer, server, smart appliance, game console, etc. In various embodiments, the electronic device 324 may include a processor 330, memory 332, a communication interface 328, and/or a display 340.

The communication interface 328 may enable the electronic device 324 to communicate with one or more other devices (e.g., servers, control devices, center pivot irrigation systems, and/or other electronic devices). The communication interface 328 may provide wired and/or wireless communication. For example, the communication interface 328 may include one or more components for wireless communication (e.g., power amplifier, low-noise amplifier, modem, encoder, decoder, upconverter, and/or downconverter). In various embodiments, the communication interface 328 may be coupled to one or more antennas 326.

The antenna(s) 326 may be utilized to radiate electromagnetic signals representing sent data (e.g., instructions, data, and/or commands). Additionally or alternatively, the antenna(s) 326 may be utilized to receive electromagnetic signals representing received data (e.g., center pivot irrigation system information). Additionally or alternatively, the communication interface 328 may include one or more components for wired communication (e.g., port(s), amplifier, signal formatter, and/or signal deformatter). For example, the communication interface 328 may transmit one or more electrical signals on one or more wires and/or receive one or more electrical signals on one or more wires (e.g., Ethernet cable, universal serial bus (USB) cable, phone cable). Accordingly, the signal(s) may be communicated using a wired and/or wireless link. For example, the signal may be communicated using a mesh network, Wi-Fi network, cellular network, Ethernet network, and/or one or more other wired and/or wireless networks. In various embodiments, the data may be communicated to one or more center pivot irrigation systems. For example, data and/or instructions may be communicated to a server, which may relay the data and/or instructions to a center pivot irrigation system (e.g., control device). In another example, the data and/or instructions may be communicated to a center pivot irrigation system over a network or communication link without being relayed by a server.

The communication interface 328 may receive center pivot irrigation system information. For example, the communication interface 328 may receive center pivot irrigation system information using a wired and/or wireless link from one or more center pivot irrigation systems. For instance, the communication interface 328 may receive a signal from a control device indicating the information. The electronic device 324 may notify one or more users of the information. For example, one or more devices may present all or part of the information on the display 340 (via a user interface 342, for instance). Examples of center pivot irrigation system information may include center pivot irrigation system location (e.g., pivot center location, coordinates, latitude and longitude, WGS coordinates) and status information or relatively current information.

The communication interface 328 may send one or more instructions to one or more center pivot irrigation systems. For example, the communication interface 328 may send instructions regarding pivot activation, pivot movement direction, pivot movement speed, whether to deliver pressurized fluid, flow of pressurized fluid, auxiliary fluid delivery, and/or pivot position, etc.

The processor 330 may be coupled to the communication interface 328, to the memory 332, and/or to the display 340. The processor 330 may execute instructions (e.g., logic, code) to perform one or more operations. The memory 332 may include instructions and/or data. In various embodiments, the memory 332 may include communication logic 334, control logic 336, and/or diagramming logic 338. The processor 330 may execute the communication logic 334, control logic 336, and/or diagramming logic 338.

In various embodiments, the communication logic 334 may enable the electronic device 324 to communicate remotely with one or more center pivot irrigation systems. For example, the communication logic 334 may enable the processor 330 to receive center pivot irrigation system information from one or more center pivot irrigation systems (directly and/or via a server, for example) and/or may enable the processor 330 to send one or more instructions to one or more center pivot irrigation systems. For instance, the communication logic 334 may be executed by the processor 330 to format instructions for reception and/or execution by one or more center pivot irrigation systems. Additionally or alternatively, the communication logic 334 may be executed by the processor 330 to interpret the center pivot irrigation system information received from one or more center pivot irrigation systems (directly and/or via a server, for example).

The control logic 336 may enable the electronic device 324 (e.g., processor 330) to remotely control one or more center pivot irrigation systems. As used herein, the term "control" and variations thereof may involve direct or indirect control. For example, control may include sending instructions or commands to another device for execution. For instance, the processor 330 may generate one or more instructions to control one or more center pivot irrigation systems based on received user input (e.g., input received via the user interface 342). In various embodiments, the control logic 336 may generate instructions to remotely control one or more center pivot irrigation systems in accordance with one or more of the functions and/or operations described in connection with one or more of FIGS. 1-2, 4-6, and/or 11-34. The instructions may be sent via the communication interface 328. For example, the instructions may be sent to a center pivot irrigation system over a network and/or via one or more servers. In another example, the instructions may be sent without any intervening device (e.g., as a direct radio signal or over a wire).

In various embodiments, the processor 330 may remotely control one or more center pivot irrigation systems. For instance, the processor 330 may remotely control pivot activation, pivot movement direction, pivot movement speed, whether pressurized fluid is being delivered, flow of pressurized fluid, whether auxiliary fluid, and/or pivot radial position, etc. For example, the processor 330 may remotely control one or more electronic switches and/or settings in order to control the one or more functions of one or more center pivot irrigation systems.

In various embodiments, the electronic device 324 may receive and/or present center pivot irrigation system information. For example, the center pivot irrigation system information may include information (e.g., status information, current information) regarding pivot activation, pivot movement direction, pivot movement speed, whether pressurized fluid is being delivered, flow of pressurized fluid, whether auxiliary fluid is being delivered, and/or pivot radial position, etc. For instance, the electronic device 324 may present one or more kinds of information on the user interface 342. The user interface 342 may be presented on the display 340. In various embodiments, the user interface 342 may present the information using one or more diagrams, shapes, maps, colors, text, controls, etc. Examples of information presentation are given in connection with one or more of FIGS. 11-31. For instance, the electronic device 324 may (e.g., the processor 330 may execute diagramming logic 338 to) render, on the circular shape of the user interface 342, an indicator of a radial position (e.g., current radial position of the pivot, current pivot angle from status information) of the center pivot irrigation system based on the center pivot irrigation system information.

In various embodiments, the electronic device 324 may request map data. For example, the electronic device 324 (e.g., communication interface 328) may send a request to one or more devices (e.g., servers) to request map data that includes one or more images including a location or locations of one or more center pivot irrigation systems. In some approaches, the electronic device 324 may request the map data based on center pivot irrigation system information (e.g., one or more locations of one or more center pivot irrigation systems). For example, the electronic device 324 may request map data by requesting one or more images including one or more locations of one or more center pivot irrigation systems. For instance, the electronic device 324 may send coordinates of one or more locations of one or more center pivots to request the map data.

In various embodiments, the communication interface 328 may receive map data (e.g., satellite map data). Examples of map data may include one or more images (e.g., satellite images) of areas where the center pivot irrigation system(s) are located, photosynthesis maps of one or more areas (e.g., fields) serviced by the center pivot irrigation system(s), and/or metadata maps (e.g., road maps, geographical maps).

The diagramming logic 338 may be executed to render a user interface 342. The user interface 342 may be a graphical user interface (GUI) that includes a representation of one or more center pivot irrigation systems. Depending on the embodiment, a variety of different user interfaces 342 may be generated and/or rendered (e.g., presented) in accordance with the systems and methods described herein. For example, the diagramming logic 338 may be executed to render a user interface 342 with a circular shape and without a map, without a circular shape and with a map, or with a circular shape and with a map. In some embodiments where a map is not rendered, map data may not be requested and/or may not be received.

In various embodiments, the electronic device 324 may (e.g., the processor 330 may execute the diagramming logic 338 to) render, on the user interface 342, a circular shape representing a center pivot irrigation system. As used herein, the term "circular shape" and variations thereof may denote a full circular shape and/or a partial circular shape (e.g., comprising one or more wedges that do not form a full circular shape). For example, a "circular shape" may be depicted as a full circle or a partial circle (e.g., a full circle having a wedge or "pie slice" shape removed). For instance, a circular shape may symbolize a center pivot irrigation system.

In various embodiments, the electronic device 324 may (e.g., the processor 330 may execute the diagramming logic 338 to) render (e.g., present) a user interface 342 with a map of a center pivot irrigation system based on the map data. For example, the electronic device 324 may present a map (e.g., satellite image, photosynthesis map, metadata map) of the center pivot irrigation system on the user interface 342.

In various embodiments, the diagramming logic 338 may be executed to render one or more markers on the user interface 342 based on the center pivot irrigation system information. As used herein, a "marker" may be a visual object (e.g., line(s), dot(s), character(s), and/or shape(s)) that may be rendered on a user interface to indicate or represent information. In some examples, the diagramming logic 338 may be utilized to render the one or more markers with the circular shape and/or map data. The marker(s) may be presented on the user interface 342. For example, the diagramming logic 338 may be executed to render a marker indicating a radial position (e.g., "current" radial position) of the pivot based on the center pivot irrigation system information. For instance, the diagramming logic 338 may be executed to render a line at the radial position of the pivot on the user interface 342 (e.g., on the circular shape and/or map). Additionally or alternatively, the diagramming logic 338 may render a marker and/or an area with a particular color (e.g., green, red, orange) to indicate an aspect of the center pivot irrigation system information. For example, if a pivot is currently moving forward, a marker and/or area may be marked in green, if the pivot is currently moving in reverse, the marker and/or area may be marked in orange, or if the pivot is not currently moving, the marker and/or area may be marked in red. In yet another example, a blue outline may be shown at an edge of the area, representing an angular range over which fluid (e.g., water) is programmed for delivery. In some examples, a marker may be presented with a particular shape to indicate an aspect of the center pivot irrigation system information.

The electronic device 324 may receive an input via the user interface 342 indicating an input point on the user interface 342. In various embodiments, the electronic device 324 may include or may be linked to an input device. In some examples, the display 340 may be a touchscreen that is sensitive to contact (from a finger and/or stylus, for instance). The touchscreen may receive the input indicating the input point on the user interface 342. In some examples, the electronic device 324 may be linked to (e.g., in communication with) a mouse, pointer, motion control, controller, or other input device. For instance, the display 340 may present a cursor. When an input (e.g., click event, tap, button press) is received, the location of the cursor or the location of contact may correspond to the input point. For example, an input point may be a location (e.g., coordinate point, pixel) corresponding to the input.

In various embodiments, the electronic device 324 (e.g., processor 330) may determine a relationship between the user interface 342 and the input point. For example, the electronic device 324 may determine a location of the input point relative to a circular shape on the user interface 342. This relationship may be expressed as a vector relative to a center point of the circular shape, as an angle relative to a direction from a center point of the circular shape, and/or as a coordinate of the circular shape, etc. Additionally or alternatively, the electronic device 324 may receive an input via the user interface 342 indicating an input point on a map of the user interface 342. For example, the electronic device 324 may determine a pixel of the map corresponding to the input point, and/or may determine a coordinate (e.g., latitude and longitude, WGS coordinate) corresponding to the pixel and/or the input point on the map.

In various embodiments, the electronic device 324 may (e.g., processor 330 may execute the diagramming logic 338 to) render, on the user interface 342, an alteration point marker on the circular shape. The alteration point marker may be rendered at a position aligned with the input point and a center of the circular shape. For example, the alteration point marker may be rendered in a linear relationship with the center of the circular shape and the input point. In some examples, the alteration point marker may be a line, a dot, a point, a character, a shape, etc. For instance, a line may be rendered in a linear relationship with the center of the circular shape or a point may be rendered in a linear relationship with the center of the circular shape. For example, the alteration point marker may be rendered at a position (e.g., pixel coordinate position) of the input point on the circular shape.

The alteration point marker may represent an alteration point for the pivot. An alteration point may be a location of the user interface 342. In some examples, the alteration point may be a value (e.g., vector, coordinate, angle) relative to the circular shape of the user interface 342. The alteration point may correspond to a radial position of the pivot at which a change in operation of the pivot is set to occur. Accordingly, the position of the alteration point marker (of the user interface 342) may correspond to a (real-world) radial position of the pivot.

In various embodiments, the electronic device 324 may (e.g., processor 330 may execute the diagramming logic 338 to) render, on the user interface 342, an alteration point marker on the map. The alteration point marker may be rendered at a position aligned with the input point and a pivot center location (on the map). For example, the alteration point marker may be rendered in a linear relationship with the pivot center location. In some examples, the alteration point marker may be a line, a dot, a point, a character, a shape, etc. For instance, a line may be rendered in a linear relationship with the pivot center location or a point may be rendered in a linear relationship with the pivot center location. For example, the alteration point marker may be rendered at a position (e.g., pixel coordinate position) of the input point on the map.

The alteration point marker may represent an alteration point for the pivot. An alteration point may be a location of the user interface 342. In some examples, the alteration point may be associated with a value (e.g., vector, coordinate, angle) relative to the map of the user interface 342. The alteration point may correspond to a radial position of the pivot at which a change in operation of the pivot is set to occur. Accordingly, the position of the alteration point marker (of the user interface 342) may correspond to a (real-world) radial position of the pivot.

The electronic device 324 may (e.g., the processor 330 may execute control logic 336 to) control the center pivot irrigation system to alter operation of the pivot at the radial position. For example, the electronic device 324 may generate one or more instructions based on the received input. For instance, the processor 330 may execute control logic 336 to generate one or more instructions for controlling one or more operations of one or more center pivot irrigation systems based on the input. The electronic device 324 may control the center pivot irrigation system by sending the instructions to alter operation of the pivot when the pivot is at the radial position. Control of the center pivot irrigation system by the electronic device 324 may be direct (e.g., control commands are issued directly to the center pivot irrigation system to alter the position of the pivot or some other aspect of the operation of the center pivot irrigation system) or indirect (e.g., the electronic device 324 issues instructions to the center pivot irrigation system and the center pivot irrigation system modifies its internally stored scheduling and operation procedures in accordance with the instructions).

In various embodiments, the user interface 342 may include one or more images and/or controls. For example, the user interface 342 may provide one or more buttons that may receive an event (e.g., touch from a touch screen, mouse click) indicating user input. In various embodiments, the electronic device 324 (e.g., processor 330) may render a fine position control in the user interface 342. For example, the fine position control may include a button or buttons, slider or sliders, etc., for adjusting the alteration point (and/or the corresponding radial position). A fine position control may enable and/or provide adjustment in an incremental fashion. For example, the fine position control may enable adjustment of the alteration point (and/or the corresponding radial position) in degree increments, sub-degree increments, pixel increments, distance increments, coordinate grid increments, etc. The electronic device 324 may receive an adjustment input corresponding to the fine position control. For example, a touch screen may receive a tap and/or drag, or a mouse may receive a click and/or drag corresponding to the fine position control. The electronic device 324 may adjust the alteration point based on the adjustment input. For example, the electronic device 324 may adjust the alteration point by one or more increments as indicated by the adjustment input.

In various embodiments, the electronic device 324 may (e.g., the processor 330 may execute the diagramming logic 338 to) combine two or more sources of information to generate one or more diagrams (e.g., maps and/or circular shapes) of one or more center pivot irrigation systems. For example, the diagramming logic 338 may be executed to combine an image of an area serviced by a center pivot irrigation system with pivot radial position information to produce a diagram that illustrates the pivot radial position (e.g., "current" radial position) with the area.

In various embodiments, the diagramming logic 338 may be executed to combine a photosynthesis map with the other map data and/or information. For example, the diagramming logic 338 may produce a diagram of a center pivot irrigation system with a photosynthesis map indicating photosynthesis activity over the area. In various embodiments, the control logic 336 may utilize the photosynthesis map to remotely control a center pivot irrigation system to deliver more fluid to one or more areas with an amount of (e.g., more or less) photosynthesis. For example, the control logic 336 may send instructions indicating one or more angle ranges with relatively slower movement speed and/or higher fluid pressure to deliver more fluid to the areas with an amount of photosynthesis. Additionally or alternatively, for example, heat maps may be utilized, and more fluid delivery may be programmed for relatively hotter areas. Also, other types of maps may be utilized beyond heat or photosynthesis maps. Examples of the user interface 342 and/or corresponding functions of the electronic device 324 are given in connection with one or more of FIGS. 11-31.

Figure 4:
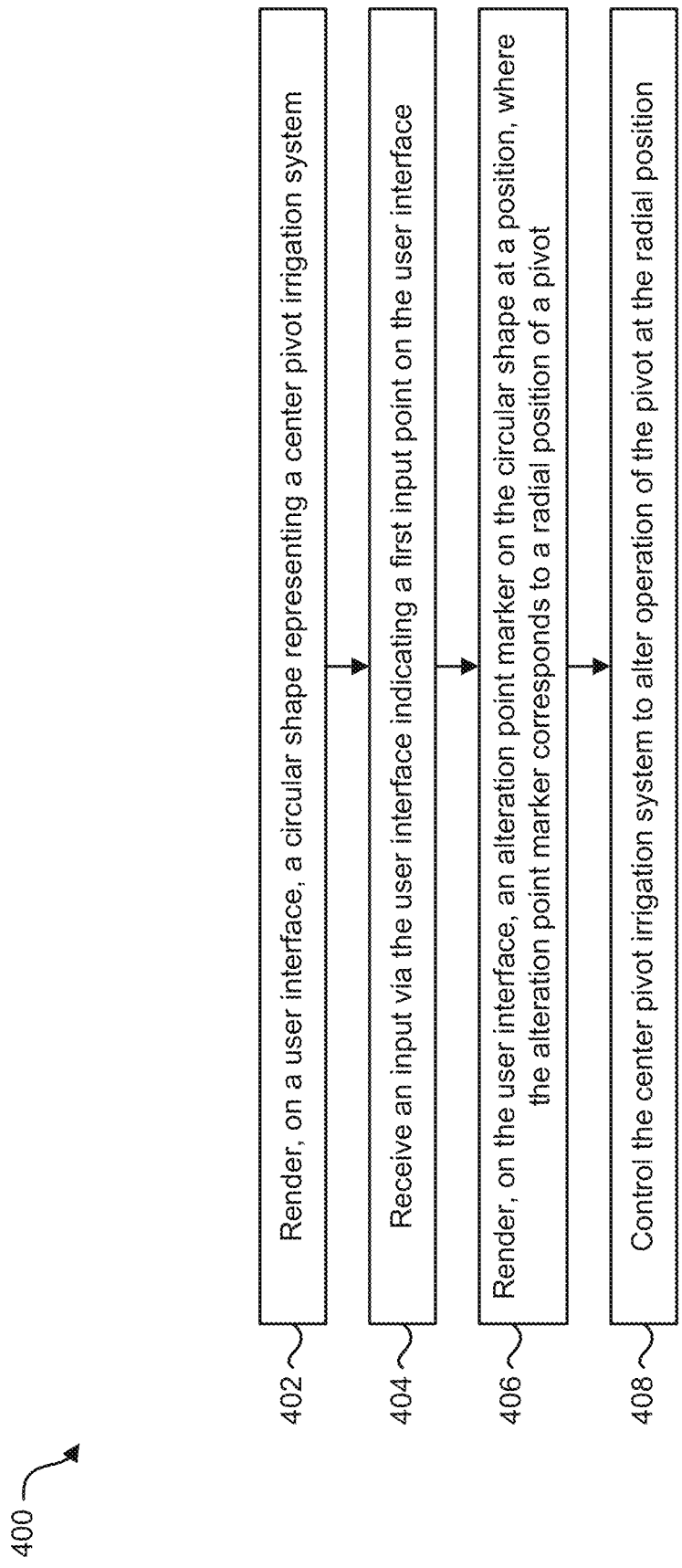
FIG. 4 is a flow diagram illustrating one configuration of a method for controlling a center pivot irrigation system.

FIG. 4 is a flow diagram illustrating one configuration of a method 400 for controlling a center pivot irrigation system. The method 400 may be performed by the electronic device 324 described in connection with FIG. 3 or another electronic device. For example, an electronic device (e.g., a processor of the electronic device) may execute instructions to perform one or more functions of the method 400.

An electronic device may render 402, on a user interface, a circular shape representing a center pivot irrigation system. This may be accomplished as described in connection with FIG. 3. As described in connection with FIG. 1, a center pivot irrigation system may include a pivot center and a pivot. The pivot may extend from the pivot center and include a plurality of irrigation sprinklers coupled to one or more irrigation lines. The pivot may be configured to rotate about the pivot center through different radial positions relative to the pivot center. Rendering 402 the circular shape may include rendering a full or partial circular shape (e.g., graphic) on the user interface.

The electronic device may receive 404 an input via the user interface indicating an input point on the user interface (e.g., on the circular shape of the user interface). This may be accomplished as described in connection with FIG. 3. For example, the electronic device may receive an input from a touch screen, mouse, controller, etc., that indicates the input point on the user interface.

The electronic device may render 406, on the user interface, an alteration point marker on the circular shape at a position. This may be accomplished as described in connection with FIG. 3. In some examples, the alteration point marker may be aligned with the input point and a center of the circular shape. The alteration point marker may represent an alteration point for the pivot, where the alteration point corresponds to a radial position of the pivot at which a change in operation of the pivot is set to occur. The position of the alteration point marker may correspond to a radial position of the pivot.

In various embodiments, the electronic device (e.g., a processor may execute the instructions to) determine the radial position based on the input point. For example, the electronic device may determine a coordinate of the input point on the circular shape (e.g., geometrical coordinates or x and y coordinates relative to the center point of the circular shape). The electronic device may calculate the radial position based on the coordinate and a coordinate of the pivot center. For example, the electronic device 324 may utilize a geometric (e.g., trigonometric) function to determine an angle of the input point relative to the circular shape (e.g., a direction). The angle may be related or transformed to the radial position. For example, the angle may directly correspond to the radial position (e.g., angle of the pivot) or may be transformed (e.g., rotated) to obtain the radial position. Other approaches may be utilized to determine the radial position.

The electronic device may control 408 the center pivot irrigation system to alter operation of the pivot at the radial position. This may be accomplished as described in connection with FIG. 3. For example, the electronic device may receive an operation input indicating the change in operation via the user interface. In various embodiments, the electronic device may control the center pivot irrigation system by commanding the center pivot irrigation system to execute the change in operation based on the alteration point (e.g., at the radial position corresponding to the alteration point). In some examples, the electronic device may control the center pivot irrigation system with a program approach and/or with a direct command approach. In the program approach, the electronic device may send a program (e.g., a set of instructions or commands) to be executed by the center pivot irrigation system. For instance, the center pivot irrigation system may execute the program and stop operation or may repeat the program as instructed by the program. In the direct command approach, the electronic device may send a command or commands to the center pivot irrigation system, which the center pivot irrigation system may execute indefinitely.

In various configurations, the electronic device may (e.g., a processor of the electronic device may execute instructions to) render a fine position control of the alteration point marker on the user interface. In some examples, the fine position control may include an increase and decrease control interface (e.g., buttons). The electronic device may receive an adjustment input corresponding to the fine position control. In response to the adjustment input, the electronic device may render, on the user interface, the alteration point marker at a second position in accordance with the adjustment input. For example, the adjustment input may indicate an adjustment (e.g., increase in angle, decrease in angle, translation in coordinate, vector modification) to the alteration point. The electronic device may adjust the alteration point and render the corresponding alteration point marker for a second position. The second position may correspond to a second radial position of the pivot. The electronic device may control the center pivot irrigation system to alter operation of the pivot at the second radial position.

In various embodiments, the electronic device may (e.g., a processor of the electronic device may execute instructions to) control the center pivot irrigation system to alter operation of the pivot at the radial position by commanding the center pivot irrigation system to stop moving, to start moving, to activate an end gun, to deactivate an end gun, to change speed, to change direction, to supply auxiliary material, to stop supplying auxiliary material, to change auxiliary material supply, to activate liquid flow, or to deactivate liquid flow at the radial position. For example, the electronic device may send one or more instructions or commands to a center pivot irrigation system (e.g., control device) to perform the change in operation at a radial position (e.g., first radial position, second radial position, and/or other radial position).

In various embodiments, the electronic device may (e.g., a processor of the electronic device may execute instructions to) render an alteration point marker at a second position aligned with a second input point. The second position may correspond to a second radial position of the pivot. The second radial position may be radially offset from (e.g., different from) the first radial position. For example, the electronic device may receive one or more additional inputs. The electronic device may render alteration point markers for the one or more additional input points. Each of the alteration point markers may respectively correspond to a radial position of the pivot where a change in operation may be set to occur.

In various embodiments, the electronic device may (e.g., a processor of the electronic device may execute instructions to) receive a second input via the user interface indicating a second input point on the circular shape of the user interface. The electronic device may render, on the display, an arc between the alteration point marker and a second alteration point marker at a second position aligned with the second input point and the location of the pivot center. The arc may indicate a range of the change in operation. In some examples, the electronic device may render, on the display, a plurality of color-coded arcs corresponding to a plurality of center pivot irrigation system operations.

In various embodiments, the electronic device may (e.g., a processor of the electronic device may execute instructions to) control the center pivot irrigation system by commanding the center pivot irrigation system to execute a change in operation in a range between a first alteration point and a second alteration point. For instance, a change in operation may be carried out in a range between alteration points (e.g., between corresponding radial positions of the pivot). For example, the electronic device may control the center pivot irrigation system to change speed at a first radial position and then change the speed at a second radial position (e.g., at the end of a range).

In various embodiments, the electronic device may (e.g., a processor of the electronic device may execute instructions to) build a command table based on the change in operation and the alteration point. For instance, the electronic device may build a table of one or more commands for execution by the center pivot irrigation system (e.g., control device). The table may include data to specify a starting radial position, an ending radial position, a device, and a setting for one or more operations. An example of a command table is given in Table (1).

TABLE 1

| | | | |
|---|---|---|---|
| Starting Radial Position A | Ending Radial Position A | Device A | Setting A |
| Starting Radial Position B | Ending Radial Position B | Device B | Setting B |

In this example, Table (1) includes a starting radial position, ending radial position, device, and setting for two commands. The starting radial position may indicate a starting radial position (e.g., starting pivot angle, coordinate, vector) at which an alteration in operation may occur. The ending radial position may indicate an ending radial position (e.g., ending pivot angle, coordinate, vector) at which an alteration in operation or action may end. The device may specify a device, such as a motor (e.g., motor for driving the pivot), a chemigator (e.g., a pump to distribute chemicals such as pesticide and/or weed killer), a fertigator (e.g., a pump to distribute fertilizer), or an end gun (e.g., a valve to activate or deactivate an end gun). The setting may specify a value, such as on or off, speed percentage (or rate of speed), forward or reverse, or other values. It should be noted that the command table may be encoded in various formats. For example, the command table may be encoded with values and/or formatting (e.g., Extensible Markup Language (XML) tags). For instance, a starting radial position may be a numeric value for an angle, an ending radial position may be a numeric value for an angle, a device may be a value that maps to different devices, and/or settings values corresponding to on, off, speed percentage, and/or forward and reverse.

In various embodiments, the electronic device may (e.g., a processor of the electronic device may execute instructions to) control the center pivot irrigation system based on the command table. For example, the electronic device may send the command table to the center pivot irrigation system for execution.

In various embodiments, the electronic device may (e.g., a processor of the electronic device may execute instructions to) display a set of thumbnail icons corresponding to a set of center pivot irrigation systems including the center pivot irrigation system. The electronic device may receive a selection input selecting the center pivot irrigation system and present the user interface with the circular shape of the center pivot irrigation system based on the selection input. Examples of thumbnail icons are given in connection with FIGS. 13-14.

Figure 5:
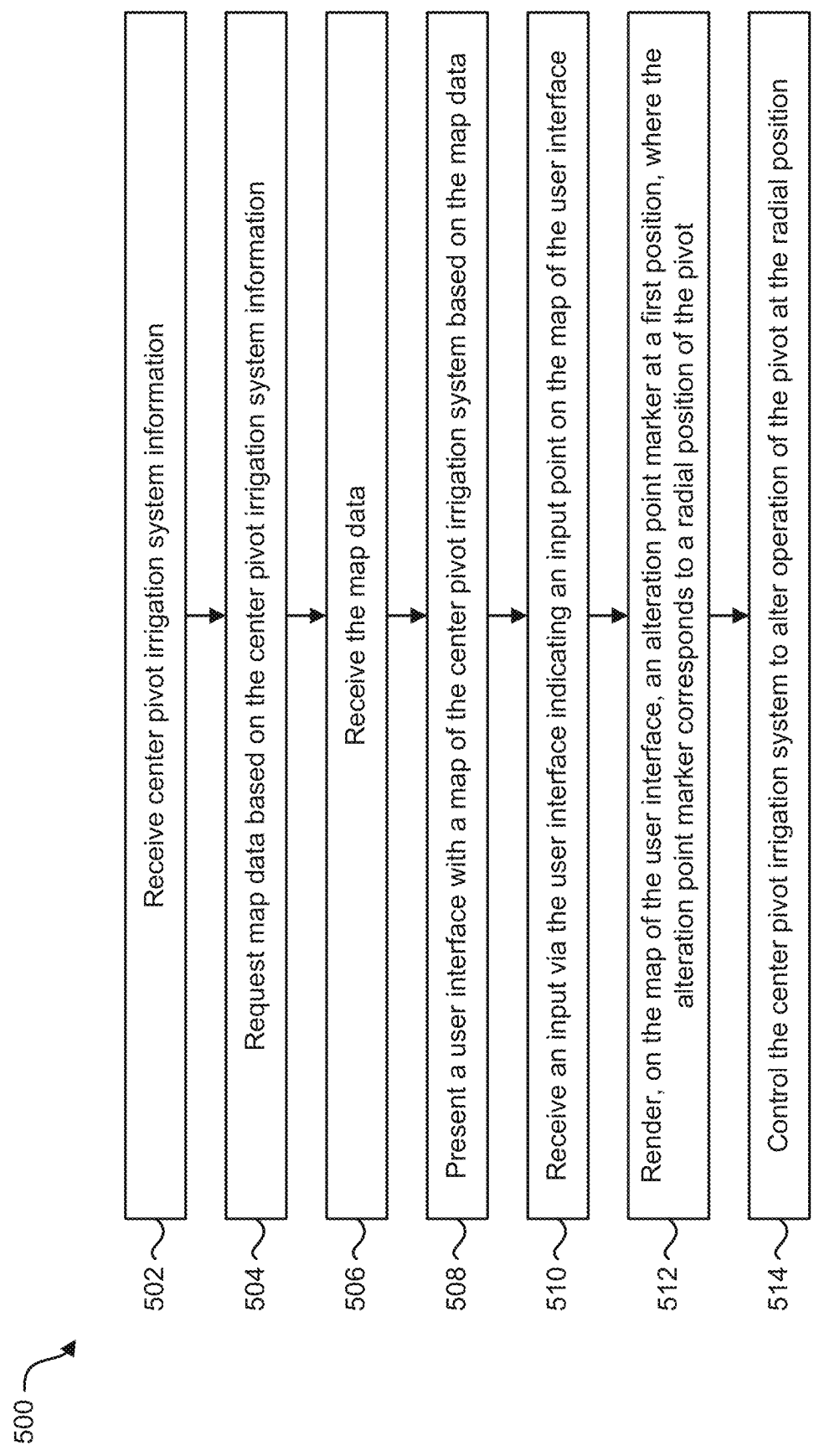
FIG. 5 is a flow diagram illustrating one configuration of a method for controlling a center pivot irrigation system.

FIG. 5 is a flow diagram illustrating one configuration of a method 500 for controlling a center pivot irrigation system. The method 500 may be performed by the electronic device 324 described in connection with FIG. 3 or another electronic device. For example, an electronic device (e.g., a processor of the electronic device) may execute instructions to perform one or more functions of the method 500.

An electronic device may receive 502 center pivot irrigation system information. This may be accomplished as described in connection with FIG. 3. For example, the electronic device may receive 502 the center pivot irrigation system information from a center pivot irrigation system (e.g., control device) and/or from a server. As described in connection with FIG. 1, a center pivot irrigation system may include a pivot center and a pivot. The pivot may extend from the pivot center and include a plurality of irrigation sprinklers coupled to one or more irrigation lines. The pivot may be configured to rotate about the pivot center through different radial positions relative to the pivot center.

The electronic device may request 504 map data based on the center pivot irrigation system information. This may be accomplished as described in connection with FIG. 3. For example, the electronic device may send a request to one or more devices (e.g., servers) to request map data that includes one or more images including a location or locations of one or more center pivot irrigation systems. The electronic device may request 504 the map data based on center pivot irrigation system information (e.g., one or more locations of one or more center pivot irrigation systems). For example, the electronic device may request map data by requesting map data including one or more images including one or more locations of one or more center pivot irrigation systems. For instance, the electronic device may send coordinates of one or more locations of one or more center pivots (as indicated by the center pivot irrigation system information) to request the map data.

The electronic device may receive 506 the map data (e.g., satellite map data, photosynthesis map data, metadata map data). This may be accomplished as described in connection with FIG. 3. For example, the electronic device may receive 506 the map data from a second server.

The electronic device may present 508 (on a display, for example) a user interface with a map of the center pivot irrigation system based on the map data. This may be accomplished as described in connection with FIG. 3. For example, the electronic device may present 508 a map (e.g., satellite image, photosynthesis map, metadata map) of the center pivot irrigation system on the user interface. In some examples, the map data may be presented in addition to or alternatively from a circular shape. In various embodiments, the electronic device may (e.g., a processor may execute the instructions to) render, on the map of the user interface, an indicator of a radial position (e.g., pivot angle) of the center pivot irrigation system based on the center pivot irrigation system information. For example, the electronic device may render a marker (e.g., point, line, dot, shape, edge, numbers, characters) that indicates a current radial position (e.g., pivot angle) indicated by the center pivot irrigation system information.

The electronic device may receive 510 an input via the user interface indicating an input point on the map of the user interface. This may be accomplished as described in connection with FIG. 3. For example, the electronic device may receive 510 an input from a touch screen, mouse, controller, etc., that indicates the input point on the map of the user interface.

The electronic device may render 512, on the map of the user interface, an alteration point marker at a position. This may be accomplished as described in connection with FIG. 3. In some examples, the alteration point marker may be aligned with the input point and a pivot center location. The alteration point marker may represent an alteration point for the pivot, where the alteration point corresponds to a radial position of the pivot at which a change in operation of the pivot is set to occur. The position of the alteration point marker may correspond to a radial position of the pivot.

In various embodiments, the electronic device may (e.g., a processor may execute the instructions to) determine the radial position based on the input point. For example, the electronic device may determine a coordinate of the input point on the map (e.g., latitude and longitude coordinates corresponding to the input point on the map). For example, each point on the map may include or indicate corresponding coordinates. The electronic device may read the corresponding coordinates from the map based on the input point on the map. The electronic device may calculate the radial position based on the coordinate and a coordinate of the pivot center location. For example, the electronic device may provide coordinates (e.g., latitude and longitude) of the pivot center location and coordinates (e.g., latitude and longitude) of the end of the pivot to a function and execute the function to obtain a bearing (e.g., pivot angle) relative to a direction (e.g., north). Other approaches may be utilized to determine the radial position.

The electronic device may control 514 the center pivot irrigation system to alter operation of the pivot at the radial position. This may be accomplished as described in connection with FIG. 3. For example, the electronic device may receive an operation input indicating the change in operation via the user interface. The electronic device may associate the alteration point (e.g., radial position or pivot angle) with the change in operation. For example, the electronic device may generate an instruction or command to perform the change in operation at the alteration point (e.g., radial position or pivot angle). In various embodiments, the electronic device may control 514 the center pivot irrigation system by commanding the center pivot irrigation system to execute the change in operation based on the alteration point (e.g., at the radial position corresponding to the alteration point). In some examples, the alteration point (e.g., a radial position corresponding to the alteration point) corresponds to an access road. In various configurations, the electronic device may (e.g., a processor of the electronic device may execute instructions to) control 514 the center pivot irrigation system by commanding the center pivot irrigation system to stop the pivot at the radial position based on the alteration input.

In various configurations, the electronic device may (e.g., a processor of the electronic device may execute instructions to) render a fine position control on the user interface. In some examples, the fine position control may include an increase and decrease control interface (e.g., buttons). The electronic device may receive an adjustment input corresponding to the fine position control. In response to the adjustment input, the electronic device may render, on the user interface, the alteration point marker at a second position in accordance with the adjustment input. For example, the adjustment input may indicate an adjustment (e.g., increase in angle, decrease in angle, translation in coordinate, vector modification) to the alteration point. The electronic device may adjust the alteration point and render the corresponding alteration point marker for a second position. The second position may correspond to a second radial position of the pivot. The electronic device may control the center pivot irrigation system to alter operation of the pivot at the second radial position.

In various embodiments, the electronic device may (e.g., a processor of the electronic device may execute instructions to) alter operation of the pivot at the radial position by commanding the center pivot irrigation system to stop moving, to start moving, to activate an end gun, to deactivate an end gun, to change speed, to change direction, to supply auxiliary material, to stop supplying auxiliary material, to change auxiliary material supply, to activate liquid flow, or to deactivate liquid flow at the radial position. For example, the electronic device may send one or more instructions or commands to a center pivot irrigation system (e.g., control device) to perform the change in operation at a radial position (e.g., first radial position, second radial position, and/or other radial position).

In various embodiments, the electronic device may (e.g., a processor of the electronic device may execute instructions to) render an alteration point marker at a second position aligned with a second input point. The second position may correspond to a second radial position of the pivot. The second radial position may be radially offset from (e.g., different from) the first radial position. For example, the electronic device may receive one or more additional inputs. The electronic device may render alteration point markers for the one or more additional input points. Each of the alteration point markers may respectively correspond to a radial position of the pivot where a change in operation may be set to occur.

In various embodiments, the electronic device may (e.g., a processor of the electronic device may execute instructions to) receive a second input via the user interface indicating a second input point on the map of the user interface. The electronic device may render, on the display, an arc between the alteration point marker and a second alteration point marker at a second position aligned with the second input point and the location of the pivot center. The arc may indicate a range of the change in operation. In some examples, the electronic device may render, on the display, a plurality of color-coded arcs corresponding to a plurality of center pivot irrigation system operations.

In various embodiments, the electronic device may (e.g., a processor of the electronic device may execute instructions to) receive a second input via the user interface indicating a second input point on the map of the user interface. The electronic device may determine a second alteration point based on the second input point and the center pivot irrigation system. In various embodiments, the electronic device may (e.g., a processor of the electronic device may execute instructions to) control the center pivot irrigation system by commanding the center pivot irrigation system to execute a change in operation in a range between a first alteration point and the second alteration point. For instance, a change in operation may be carried out in a range between alteration points (e.g., between corresponding radial positions of the pivot). For example, the electronic device may control the center pivot irrigation system to activate an end gun at a first radial position and then deactivate the end gun at a second radial position (e.g., at the end of a range).

In various embodiments, the electronic device may (e.g., a processor of the electronic device may execute instructions to) build a command table based on the change in operation and the alteration point. This may be accomplished as described in connection with FIG. 4 and/or Table (1). For instance, the electronic device may build a table of one or more commands for execution by the center pivot irrigation system (e.g., control device).

In various embodiments, the electronic device may (e.g., a processor of the electronic device may execute instructions to) control the center pivot irrigation system based on the command table. For example, the electronic device may send the command table to the center pivot irrigation system for execution.

In various embodiments, the electronic device may (e.g., a processor of the electronic device may execute instructions to) display a set of thumbnail icons corresponding to a set of center pivot irrigation systems including the center pivot irrigation system. The electronic device may receive a selection input selecting the center pivot irrigation system, where presenting the user interface with the map of the center pivot irrigation system based on the map data is based on the selection input. Examples of thumbnail icons are given in connection with FIGS. 13-14.

Figure 6:
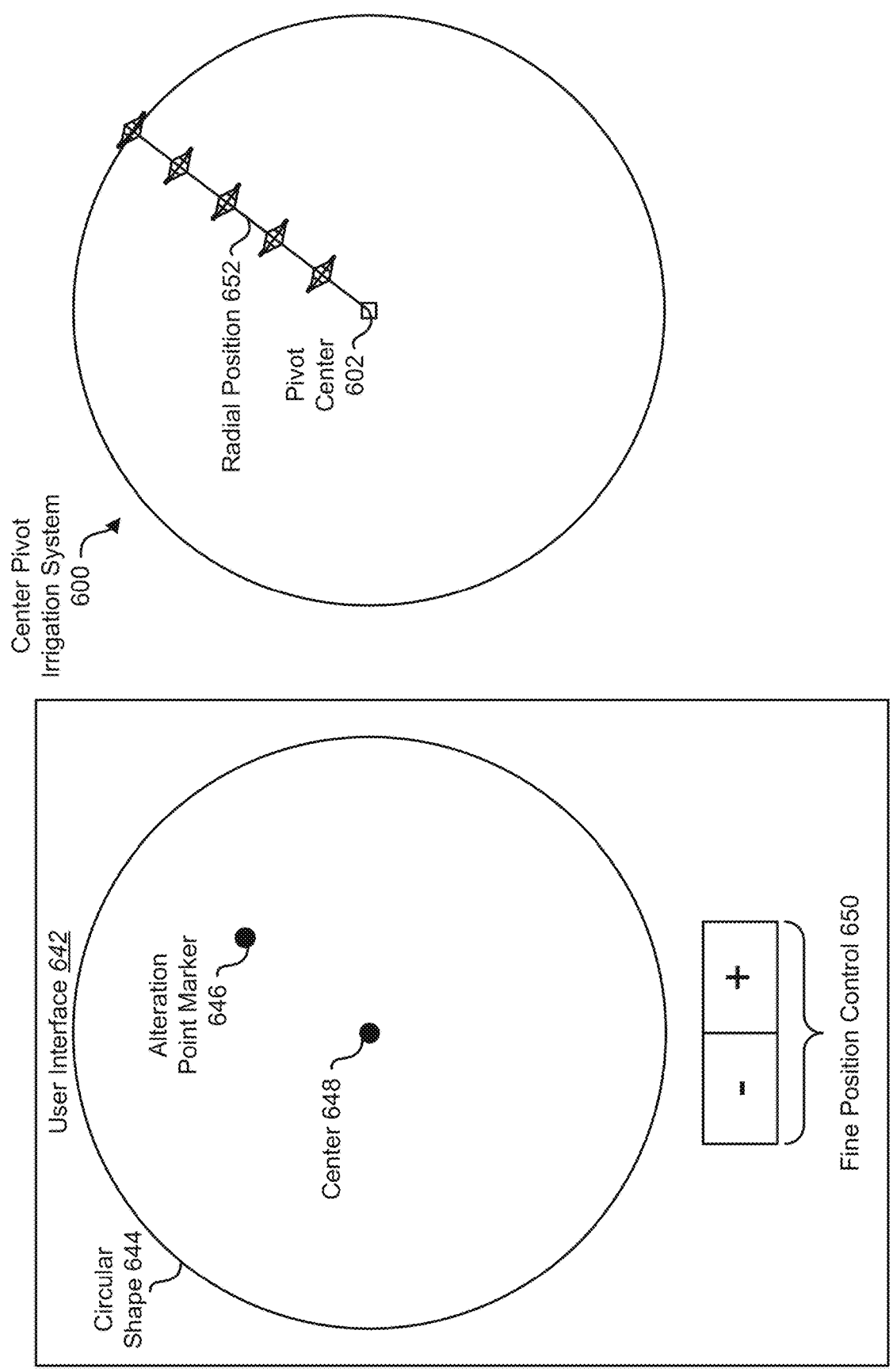
FIG. 6 is a diagram illustrating an example of a user interface and a center pivot irrigation system in accordance with various embodiments of the systems and methods disclosed herein.

FIG. 6 is a diagram illustrating an example of a user interface 642 and the center pivot irrigation system in accordance with various embodiments of the systems and methods disclosed herein. In this example, the user interface 642 includes a circular shape 644. The circular shape 644 includes a center 648. As described herein, an input may be received and an alteration point marker 646 may be rendered on the circular shape 644. The alteration point marker 646 represents an alteration point corresponding to the radial position 652 of the pivot of a center pivot irrigation system 600 at which a change in operation of the pivot is set to occur. In this example, the alteration point marker is illustrated as a dot. It should be noted that the alteration point marker 646 may be illustrated (e.g., rendered) differently. For example, the alteration point marker 646 may be rendered as a line, an edge of an arc, a shape, and/or a vector, etc.

As can be observed, the relationship (e.g., angle, vector, coordinate) between the center 648 and the alteration point marker 646 on the circular shape 644 corresponds to the relationship (e.g., angle, vector, coordinate) between the pivot center 602 and the radial position 652.

In the example illustrated in FIG. 6, the user interface 642 includes a fine position control 650. The fine position control 650 may be utilized to adjust the position of the alteration point marker 646. For example, the plus (+) button may increase an angle of the alteration point marker 646 and the minus (−) button may decrease the angle of the alteration point marker 646.

Figure 7:
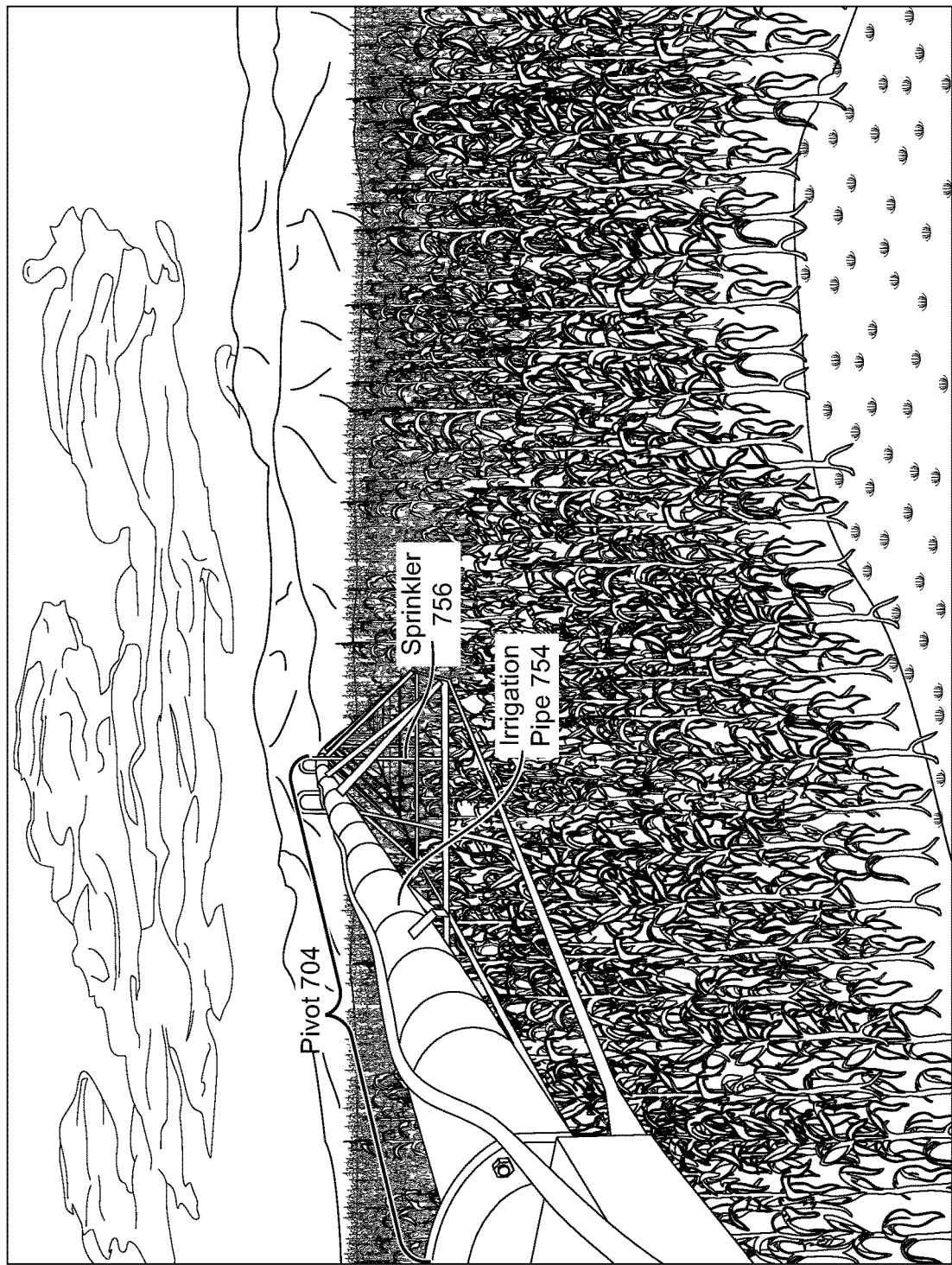
FIG. 7 is a drawing illustrating an example of a pivot of a center pivot irrigation system.

FIG. 7 is a drawing illustrating an example of a pivot 704 of a center pivot irrigation system. As illustrated in FIG. 7, the pivot 704 includes irrigation pipe 754 and a sprinkler 756.

Figure 8:
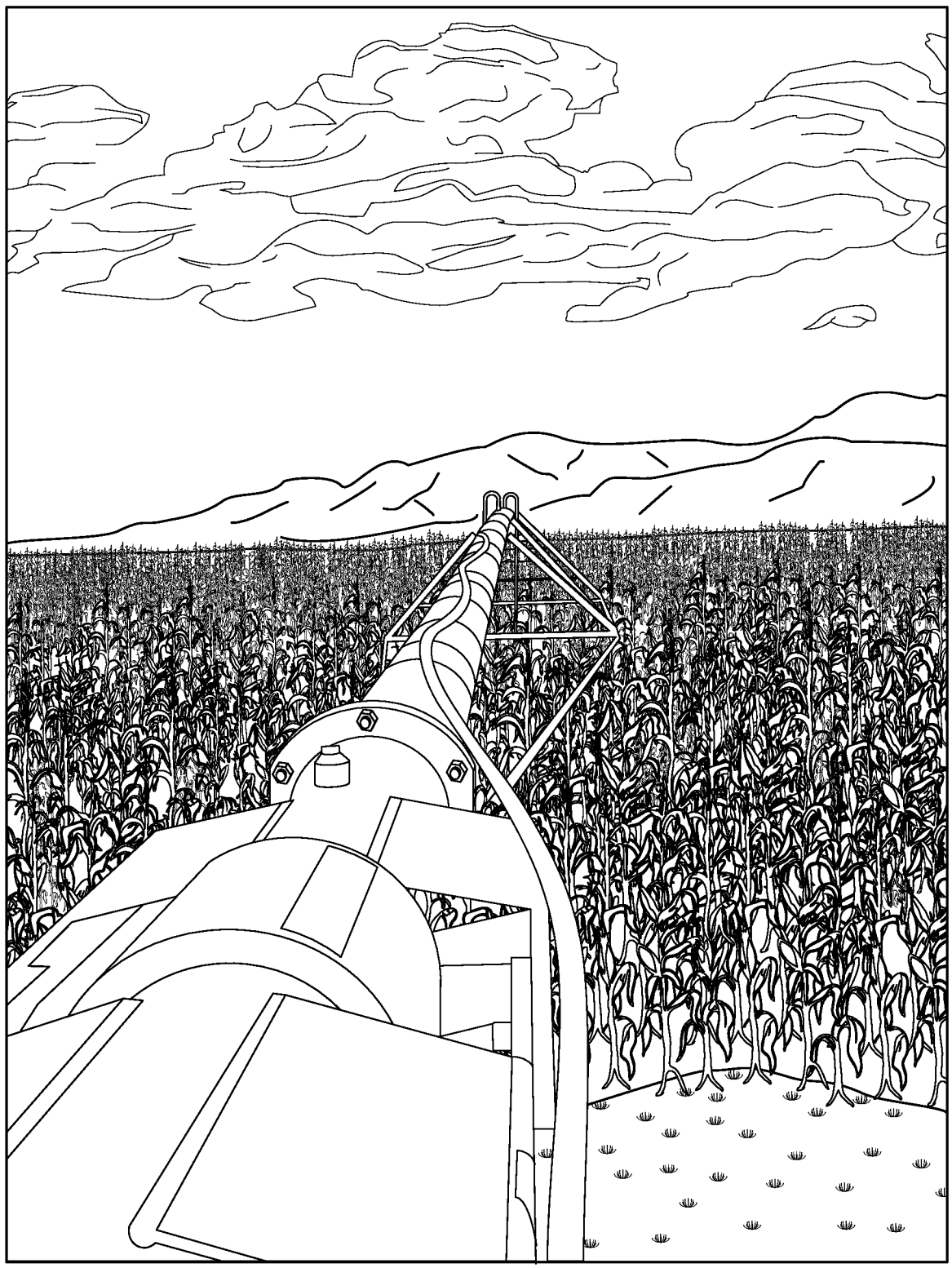
FIG. 8 is a drawing illustrating another example of a pivot of a center pivot irrigation system.
Figure 9:
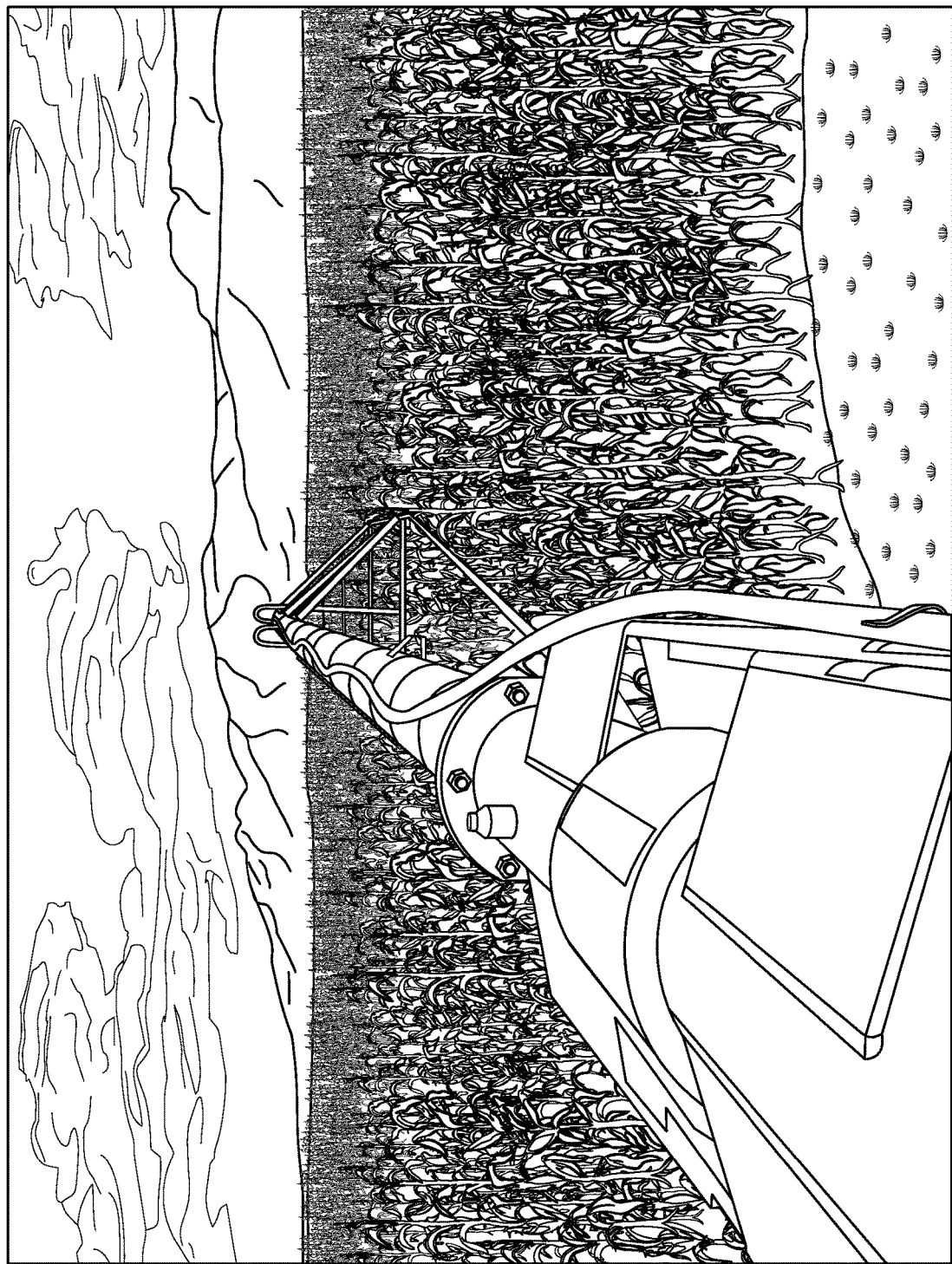
FIG. 9 is a drawing illustrating another example of a pivot of a center pivot irrigation system.

FIG. 8 is a drawing illustrating another example of a pivot of a center pivot irrigation system. FIG. 9 is a drawing illustrating another example of a pivot of a center pivot irrigation system. FIG. 10 is a drawing illustrating an example of a housing 1058 of a center pivot irrigation system in which a control device may be housed.

Figure 11:
FIG. 11 is an example of a user interface for remotely controlling a center pivot irrigation system.

FIG. 11 is an example of a user interface 1160 for remotely controlling a center pivot irrigation system. The user interface 1160 may be presented on an electronic device (e.g., the electronic device 324 described in connection with FIG. 3). The user interface 1160 includes interactive controls for devices, settings, a view list, logging in/out, and checking for updates. When activated, the "Devices" control may navigate to a user interface showing a set of one or more devices (e.g., one or more center pivot irrigation systems).

Figure 12:
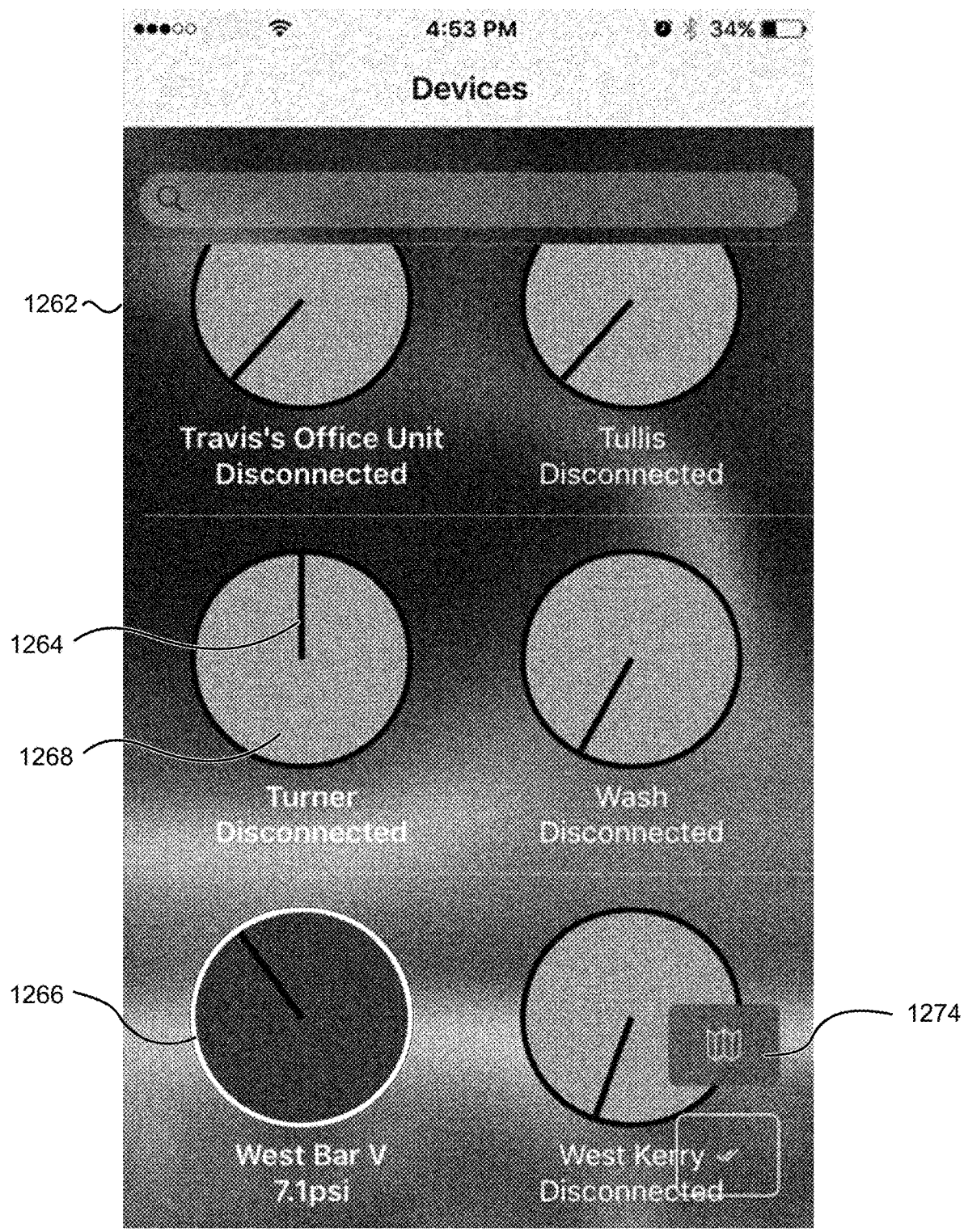
FIG. 12 is an example of another user interface for remotely controlling a center pivot irrigation system.

FIG. 12 is an example of another user interface 1262 for remotely controlling a center pivot irrigation system. In this example, diagrams (e.g., circular shapes) of six center pivot irrigation systems are shown. Each diagram includes a line 1264 showing a pivot angle of the corresponding center pivot irrigation system. An outline 1266 around each circle may indicate whether (and/or at what angle range) a center pivot irrigation system is delivering fluid. For example, a blue outline may indicate that water is being pumped through the center pivot irrigation system. Each of the diagrams (e.g., an area 1268 in a circular shape and/or a portion of the area of a circular shape) may be color coded to indicate a status of the corresponding center pivot irrigation system. For example, green may indicate forward motion, orange may indicate reverse motion, red may indicate that the center pivot irrigation system is stopped, and/or gray may indicate that the center pivot irrigation system is disconnected (e.g., not currently in communication with the electronic device). Other color schemes may be utilized. In some examples, color coding may cover only a portion of the circular shape (e.g., an angular range) and/or may be semi-transparent. As shown in FIG. 12, the user interface 1262 may show a name for each center pivot irrigation system and/or a status. For example, the "7.1 psi" label may indicate that fluid is currently being delivered at the "West Bar V" center pivot irrigation system at 7.1 pounds per square inch (psi). If one of the diagrams is activated (e.g., if a touch or click event is detected for one of the diagrams), the user interface 1262 may navigate to a user interface showing more detail and/or control options for the corresponding center point irrigation system. A search feature for center pivot irrigation systems is also provided. A map view button 1274 is also provided, which may navigate to a map view of center pivot irrigation system(s) when activated.

Figure 13:
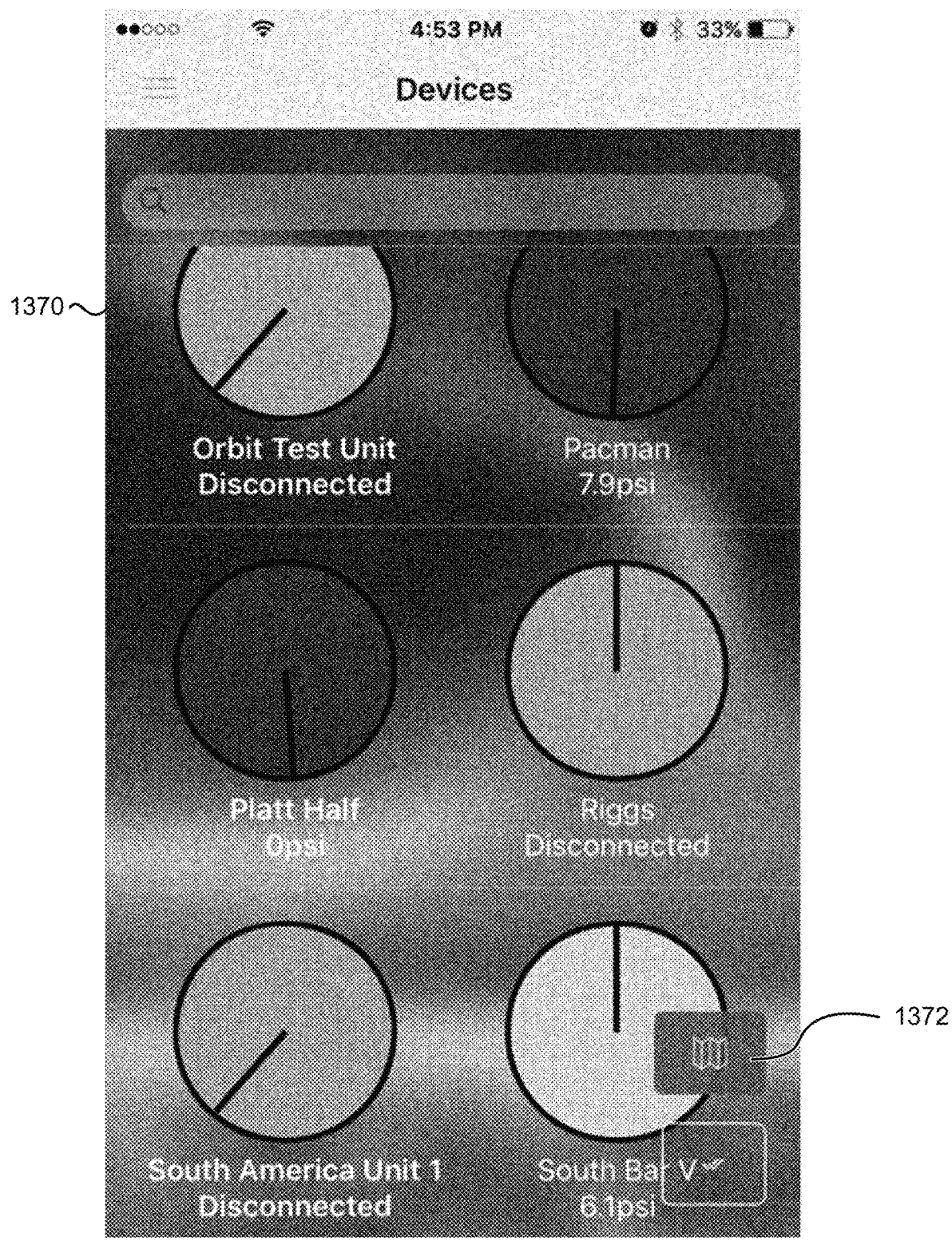
FIG. 13 is another example of a user interface illustrating multiple diagrams of center pivot irrigation systems.

FIG. 13 is another example of a user interface 1370 illustrating multiple diagrams of center pivot irrigation systems. As described in connection with FIG. 12, color coding may be utilized to indicate information for one or more center pivot irrigation systems. A map view button 1372 is also shown in FIG. 13. In some examples, each of the diagrams may be utilized as thumbnail icons to represent a center pivot irrigation system.

Figure 14:
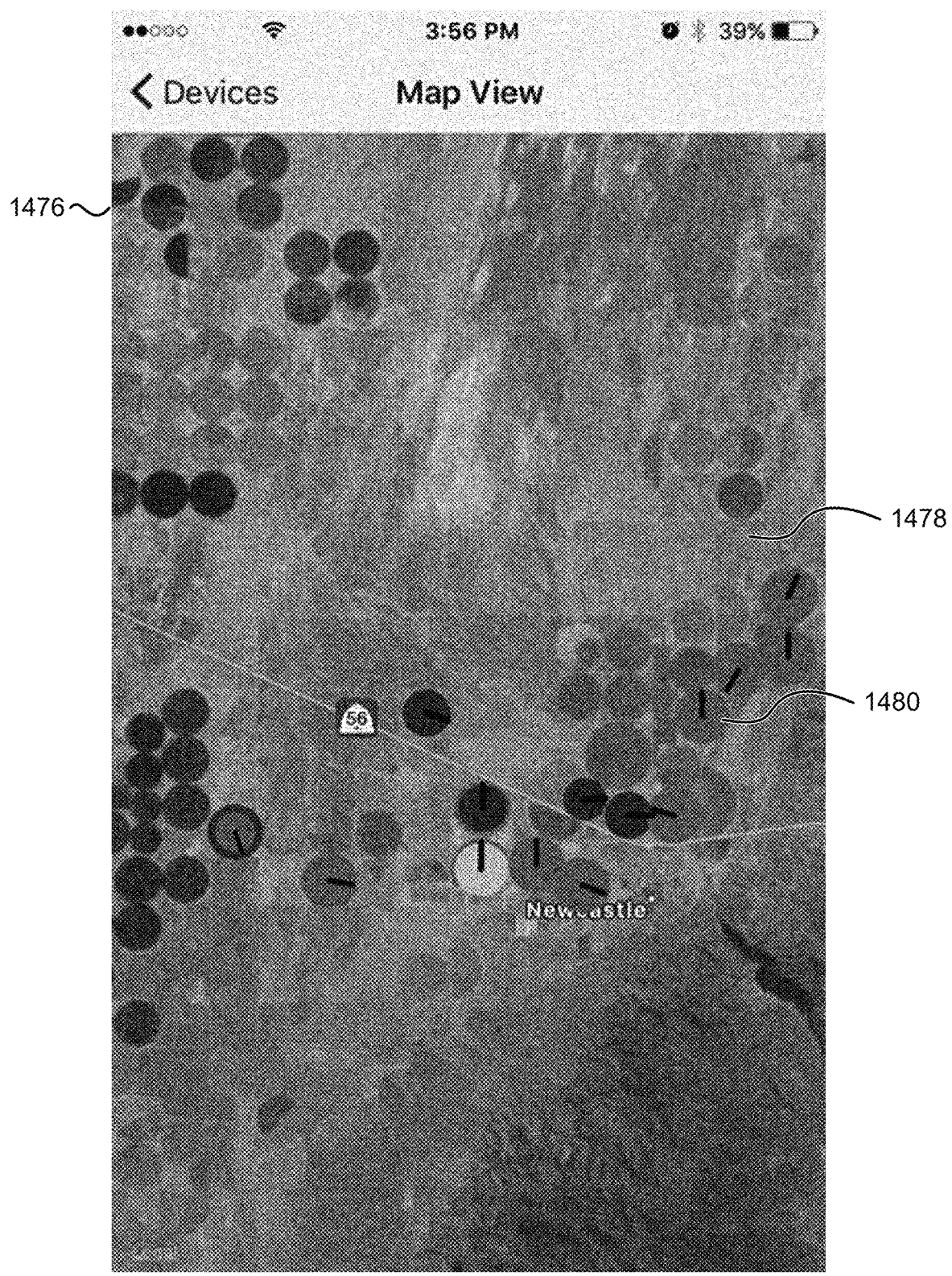
FIG. 14 is an example of a user interface showing a map view of center pivot irrigation systems.

FIG. 14 is an example of a user interface 1476 showing a map view of center pivot irrigation systems. As shown in FIG. 14, a user interface 1476 may provide a map view of multiple center pivot irrigation systems. The map view may show one or more diagrams 1480 (e.g., circular shapes) of center pivot irrigation systems overlaid on a map 1478. In some examples, each of the diagrams may be utilized as thumbnail icons to represent a center pivot irrigation system. In various embodiments, the map view may show a satellite image with information expressed. For example, lines may be illustrated to show pivot angles for each of the pivots of the center pivot irrigation systems. Additionally or alternatively, color coding may be utilized to illustrate one or more aspects of the information (e.g., whether in operation, direction of motion). The user interface may navigate to a more detailed view and/or provide control options if one of the center pivot irrigation system diagrams is indicated by received user input (e.g., a touch, a click).

Figure 15:
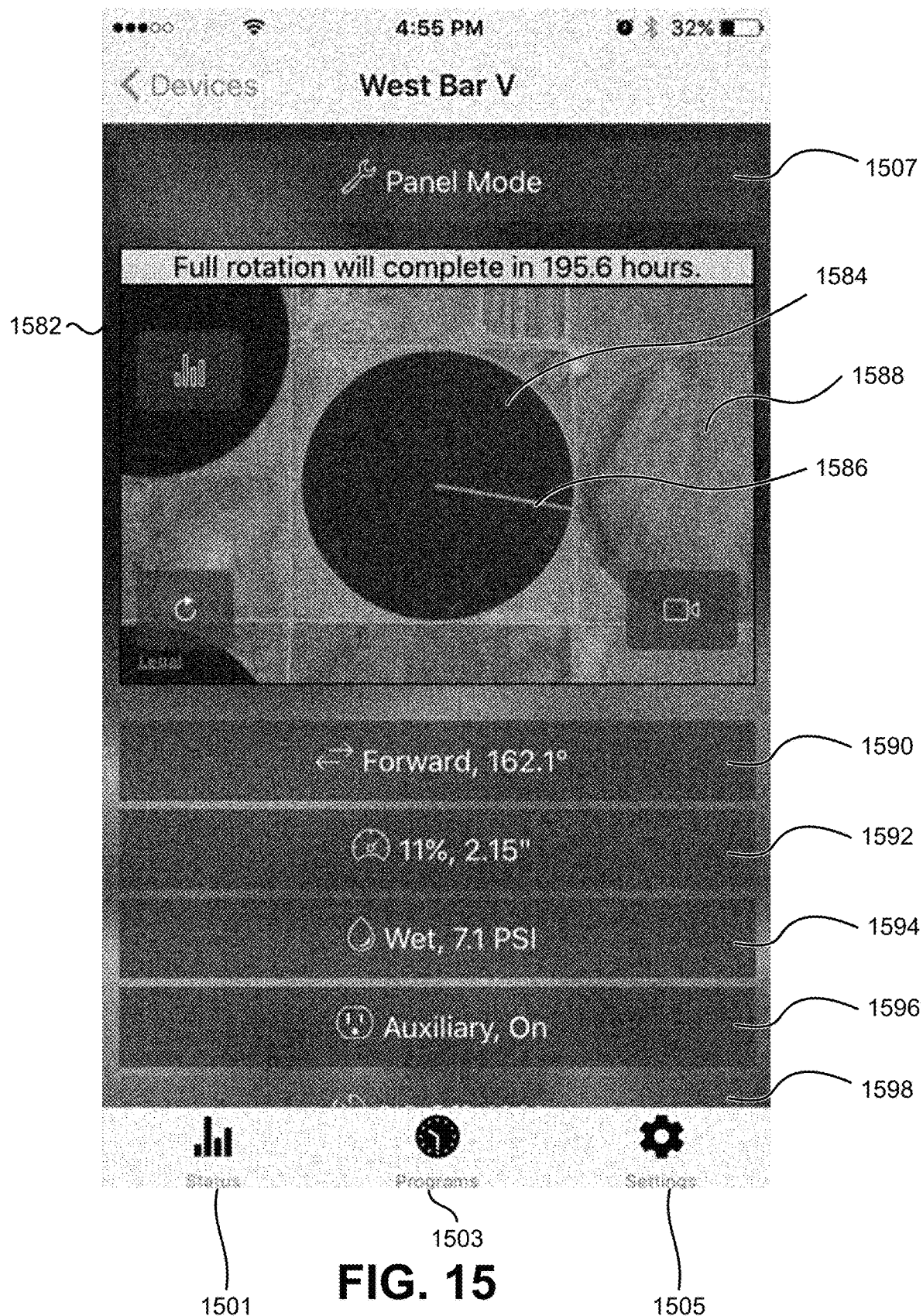
FIG. 15 is an example of a user interface showing a detailed view of a center pivot irrigation system.

FIG. 15 is an example of a user interface 1582 showing a detailed view of a center pivot irrigation system. The user interface 1582 may include a button and/or label 1507 for a mode (e.g., panel mode or remote mode). The user interface 1582 may include a diagram 1584 (e.g., circular shape) overlaid on map data 1588 illustrating pivot angle 1586, color coding to indicate motion direction, and/or an outline to indicate whether fluid is being delivered and/or an angular range of fluid delivery. The user interface 1582 may include a direction button 1590, a speed button 1592, a delivery button 1594, an auxiliary control button 1596, and/or a stop-in-slot button 1598 (which is partially obscured in FIG. 15). As indicated, other buttons may include a status button 1501, a program button 1503, and/or a settings button 1505.

Figure 16:
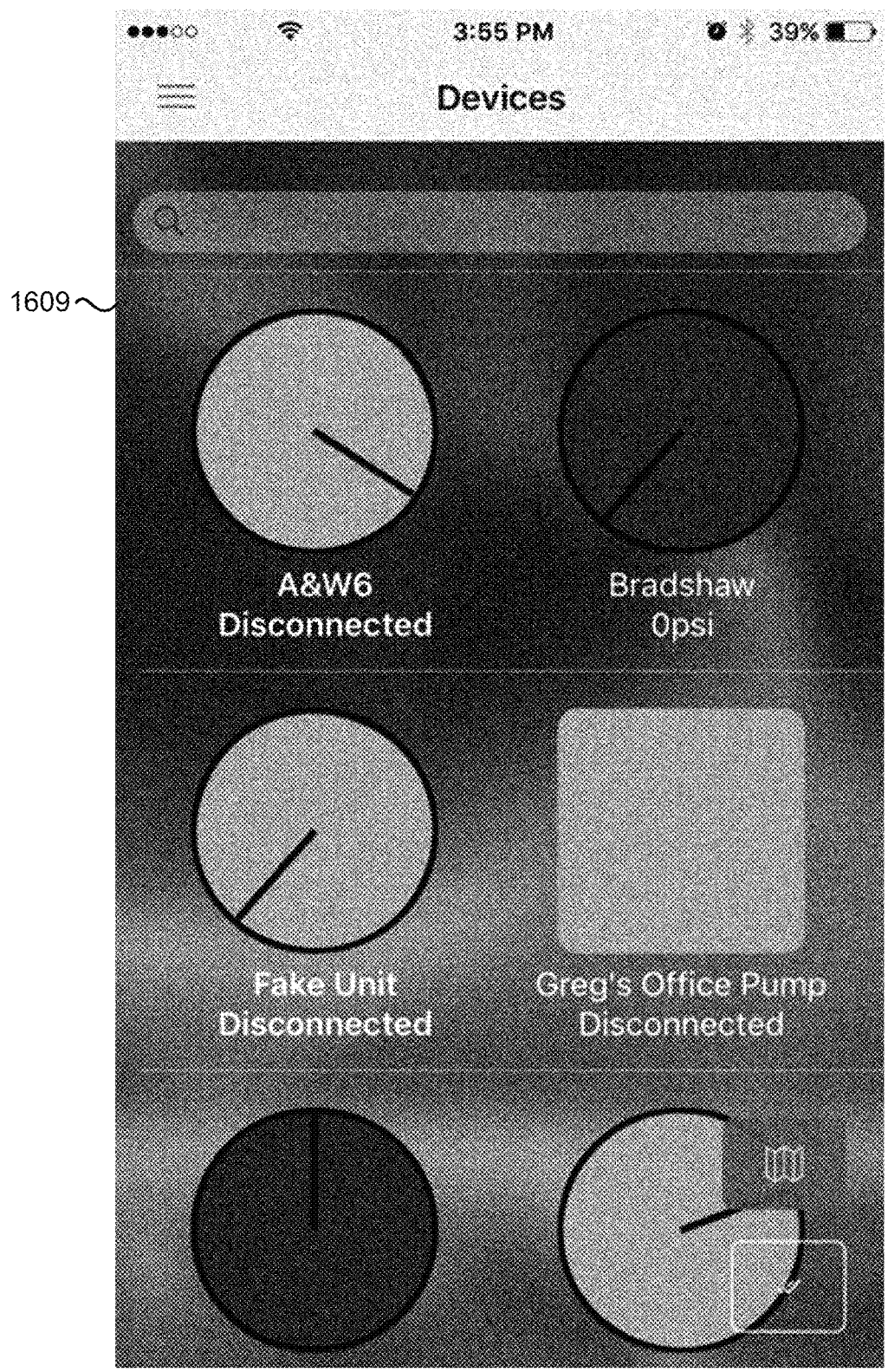
FIG. 16 is another example of a user interface illustrating multiple diagrams of center pivot irrigation systems.

FIG. 16 is another example of a user interface 1609 illustrating multiple diagrams of center pivot irrigation systems. As described in connection with FIG. 12, color coding may be utilized to indicate information for one or more center pivot irrigation systems. Selecting one of the center pivot irrigation systems may navigate to a user interface offering more detail on the selected center pivot irrigation system as shown in FIG. 17.

Figure 17:
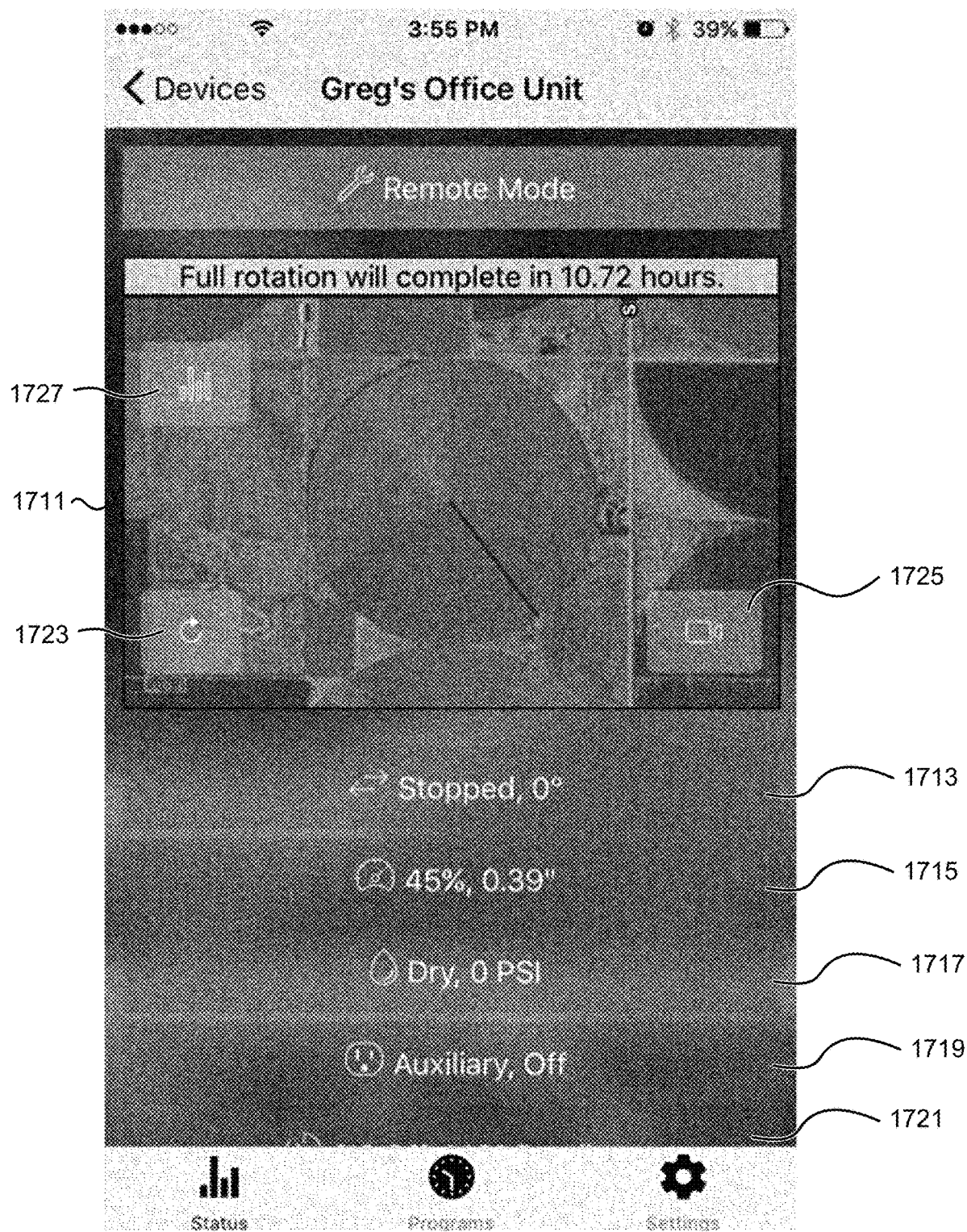
FIG. 17 is another example of a user interface showing a detailed view of a center pivot irrigation system.

FIG. 17 is another example of a user interface 1711 showing a detailed view of a center pivot irrigation system. For example, the center pivot irrigation system may have been selected from the user interface 1609 in FIG. 16. The user interface 1711 may include a button for selecting a mode (e.g., panel mode for controlling the center pivot irrigation system on-site or remote mode for remotely controlling of the center pivot irrigation system). The user interface 1711 may include a diagram overlaid on map data illustrating pivot angle, color coding to indicate motion direction, and/or an outline to indicate whether fluid is being delivered and/or an angular range of fluid delivery. The user interface 1711 may include a direction button 1713, a speed button 1715, a delivery button 1717, an auxiliary control button 1719, and/or a stop-in-slot button 1721. For example, activating the auxiliary control button 1719 may provide options for activating or deactivating auxiliary delivery (e.g., fertilizer and/or pesticide). If the stop-in-slot button 1721 is activated, the pivot may be controlled to stop the pivot at a particular angle (e.g., along an access road and/or at some set angle). Other buttons may include a status button, a program button, and/or a settings button. Additionally or alternatively, a refresh button 1723, a camera button 1725, and/or a status button 1727 may also be shown.

Figure 18:
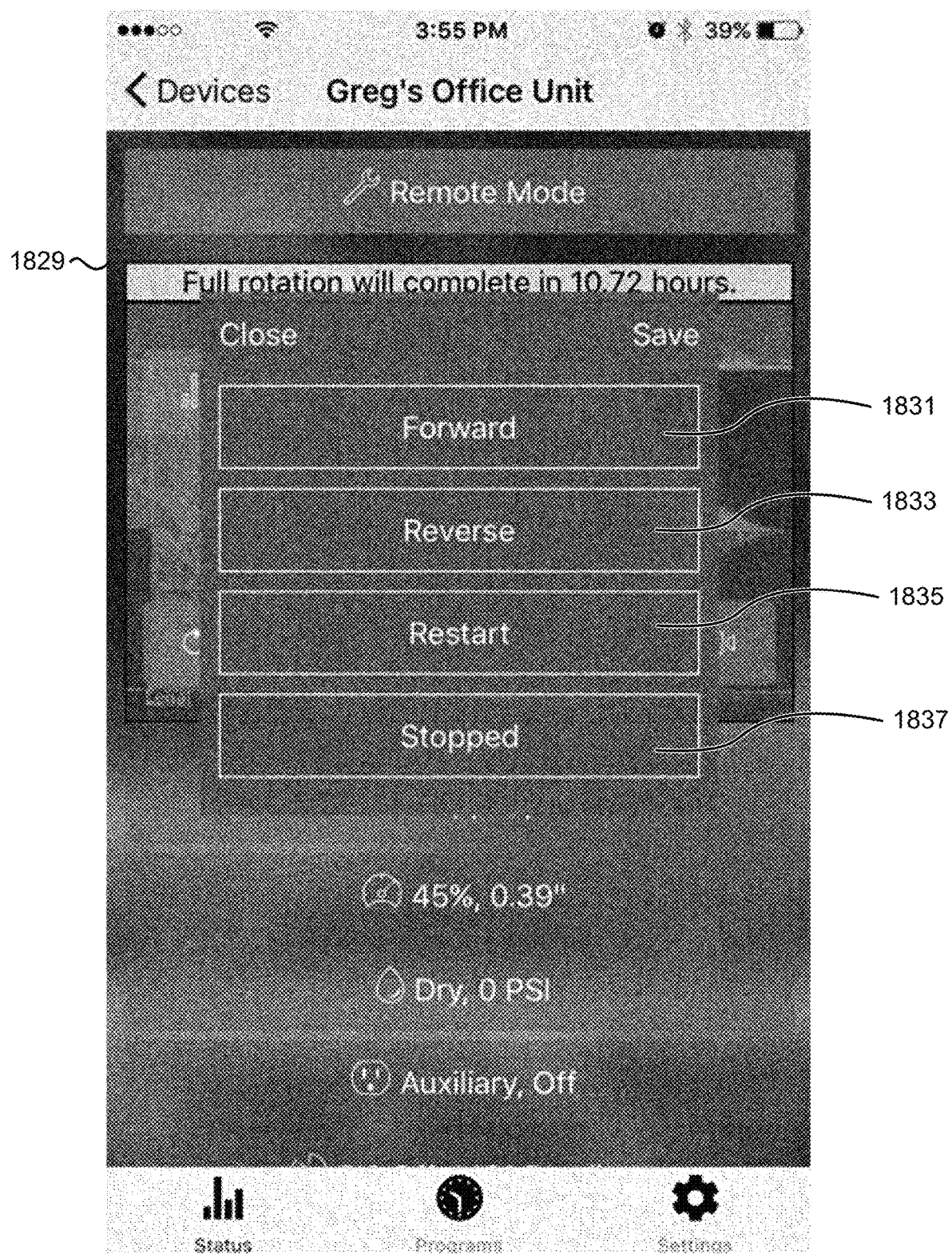
FIG. 18 is an example of a user interface when a direction button is activated.

FIG. 18 is an example of a user interface 1829 when a direction button is activated. For example, activating the direction button may provide options for control, such as buttons for forward motion 1831, reverse motion 1833, starting (or restarting) motion 1835, and/or stopping 1837.

Figure 19:
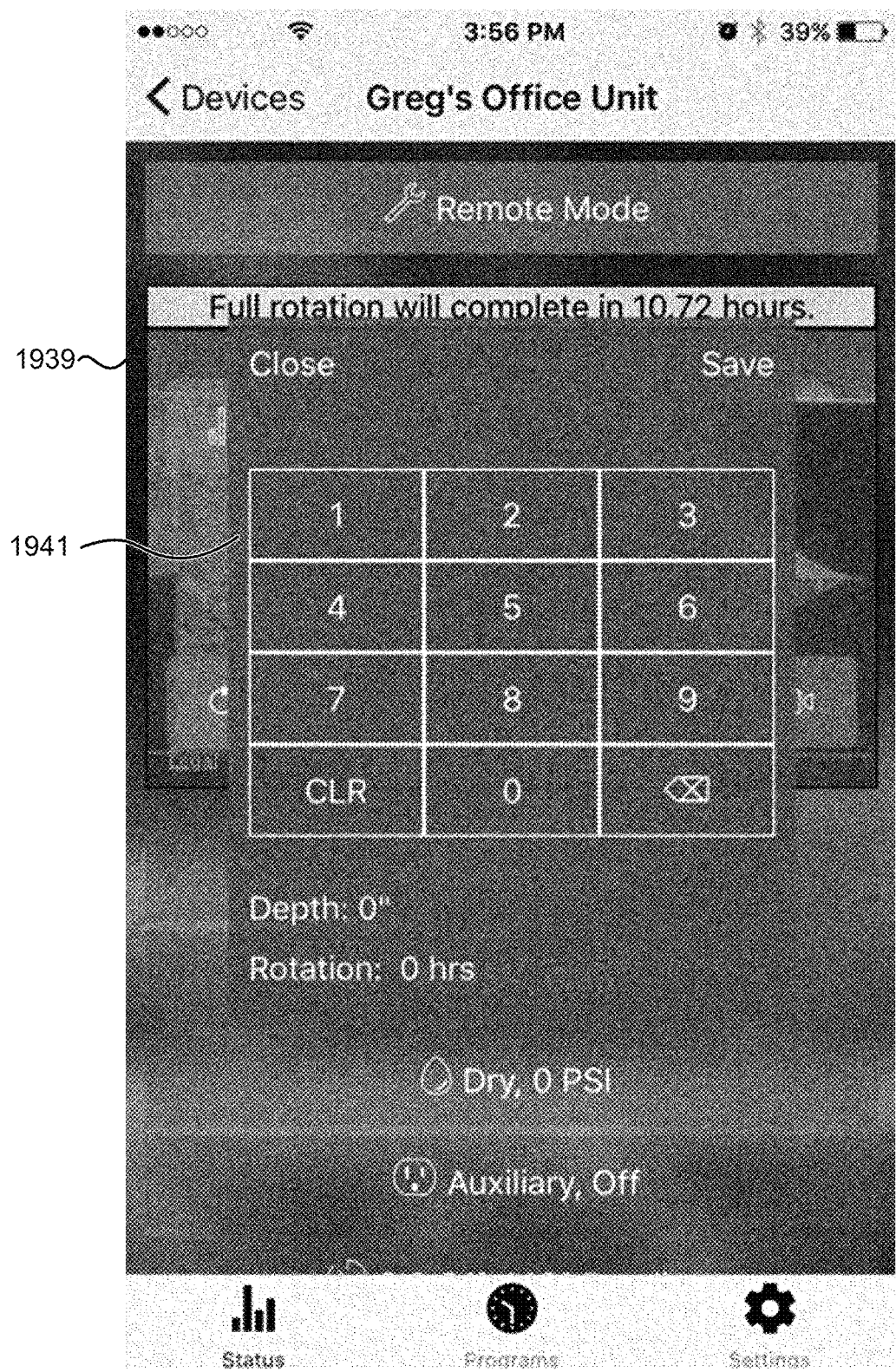
FIG. 19 is an example of a user interface when a speed button is activated.

FIG. 19 is an example of a user interface 1939 when a speed button is activated. For example, activating the speed button may provide a virtual keypad 1941 for specifying a speed. In some embodiments, the speed may be expressed in terms of a percentage of a maximum speed.

Figure 20:
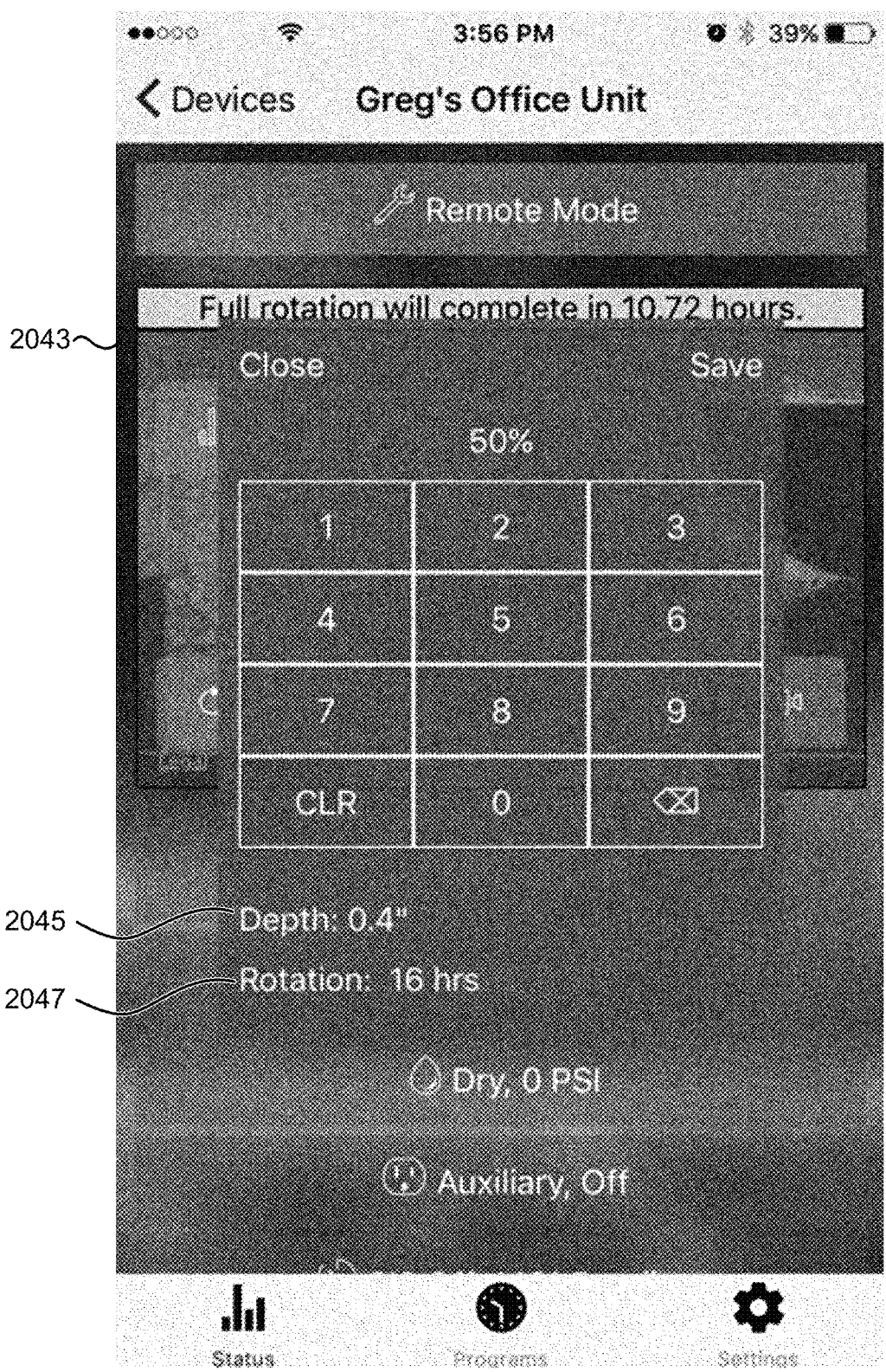
FIG. 20 is another example of a user interface when a speed button is activated.

FIG. 20 is another example of a user interface 2043 when a speed button is activated. For example, when a speed is specified, the user interface 2043 may indicate a depth 2045 (e.g., number of inches of pressurized fluid being delivered) and/or an amount of rotation time 2047 needed to complete a rotation at the current speed. Other options for controlling speed may be provided, such as sliders, radio buttons, etc.

Figure 21:
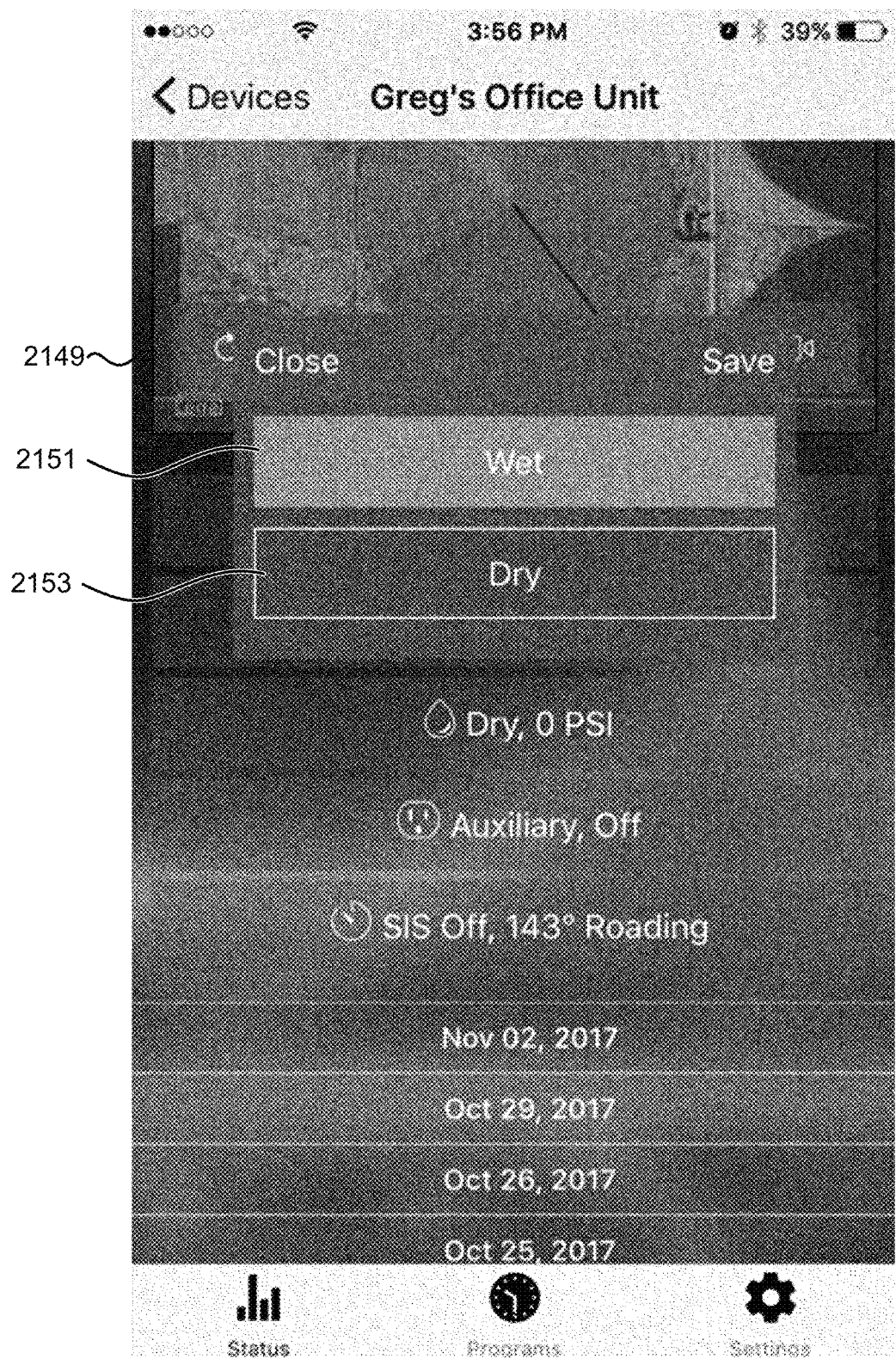
FIG. 21 is an example of a user interface when a delivery button is activated.

FIG. 21 is an example of a user interface 2149 when a delivery button is activated. For example, activating the delivery button may provide options for activating delivery 2151 (e.g., "wet") and deactivating delivery 2153 (e.g., "dry"). These options may control whether a fluid pump is activated.

Figure 22:
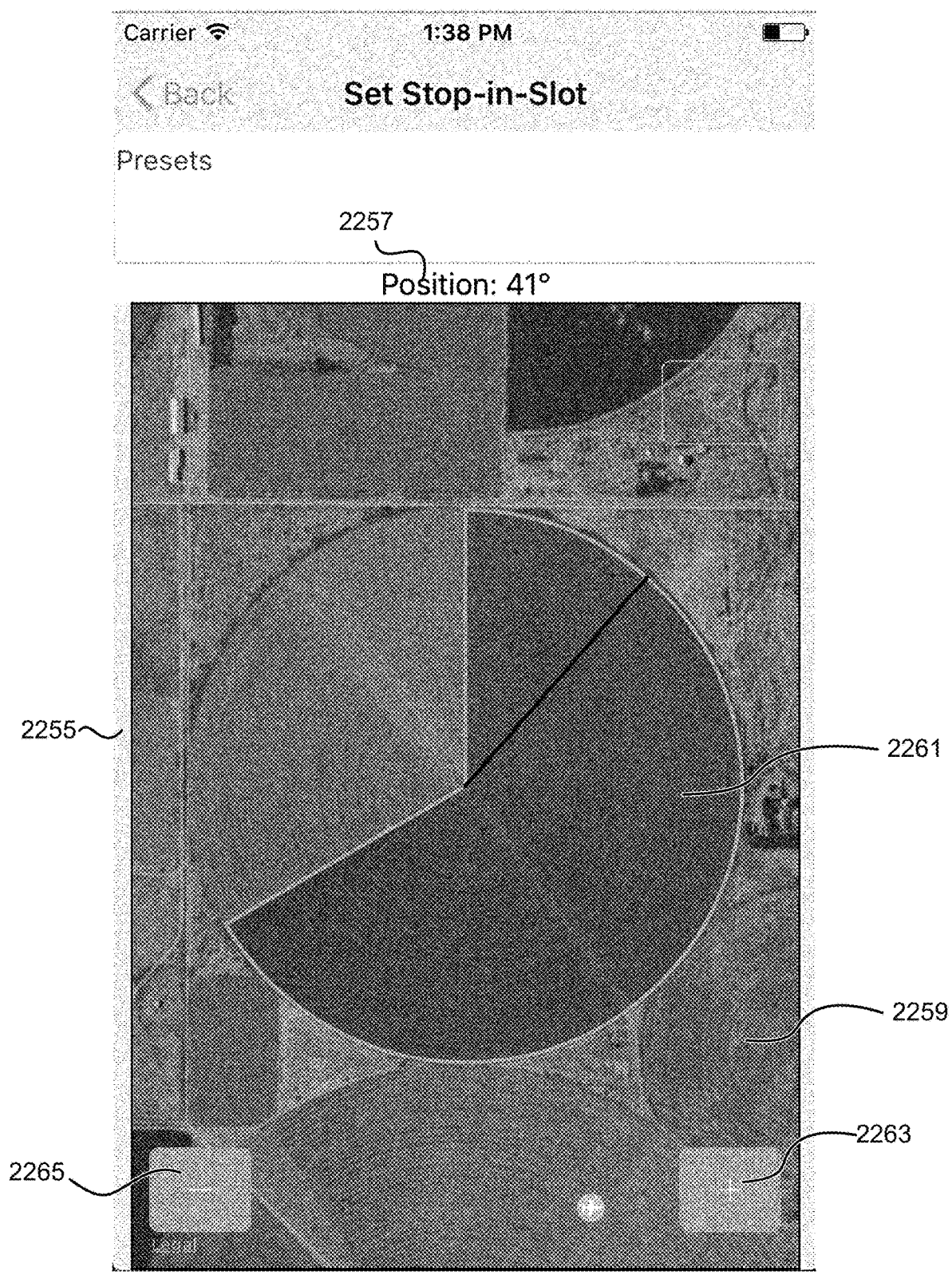
FIG. 22 is an example of a user interface for setting a stop-in-slot angle.

FIG. 22 is an example of a user interface 2255 for setting a stop-in-slot angle. In this example, the stop-in-slot angle 2257 is currently at 41 degrees. The user interface 2255 may show a detailed view (e.g., a map 2259) of the area covered by the center pivot irrigation system. In this example, it may be observed that only an angular portion 2261 of the area is color coded and outlined. This may illustrate programming for the area (e.g., only an angular range that is being watered). In some examples, the pivot may be set to automatically reverse when reaching the end of the angular portion 2261. In various embodiments, the stop-in-slot angle 2257 may be adjusted using a touchscreen interface and/or a mouse pointer. In addition, the plus button 2263 and minus button 2265 may be utilized for fine adjustment of the stop-in-slot angle 2257.

Figure 23:
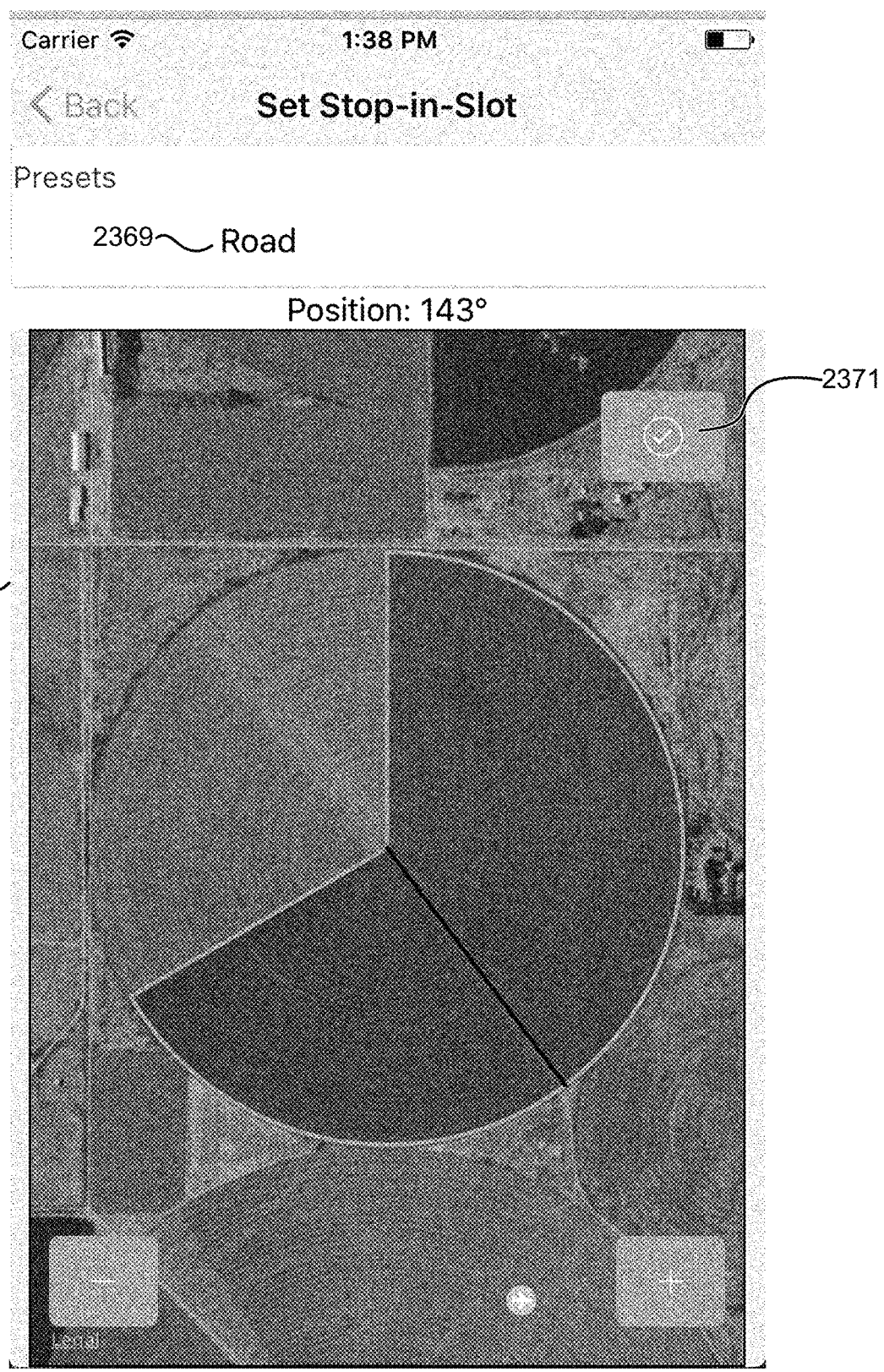
FIG. 23 is another example of a user interface for setting a stop-in-slot angle.

FIG. 23 is another example of a user interface 2367 for setting a stop-in-slot angle. In this example, the user interface 2367 enables assigning names 2369 to a stop-in-slot for later reference and/or selection. For instance, the stop-in-slot may be named "Road" for stopping at an access road. A confirmation button 2371 is also provided for confirming the stop-in-slot setting and/or returning to a previous user interface.

Figure 24:
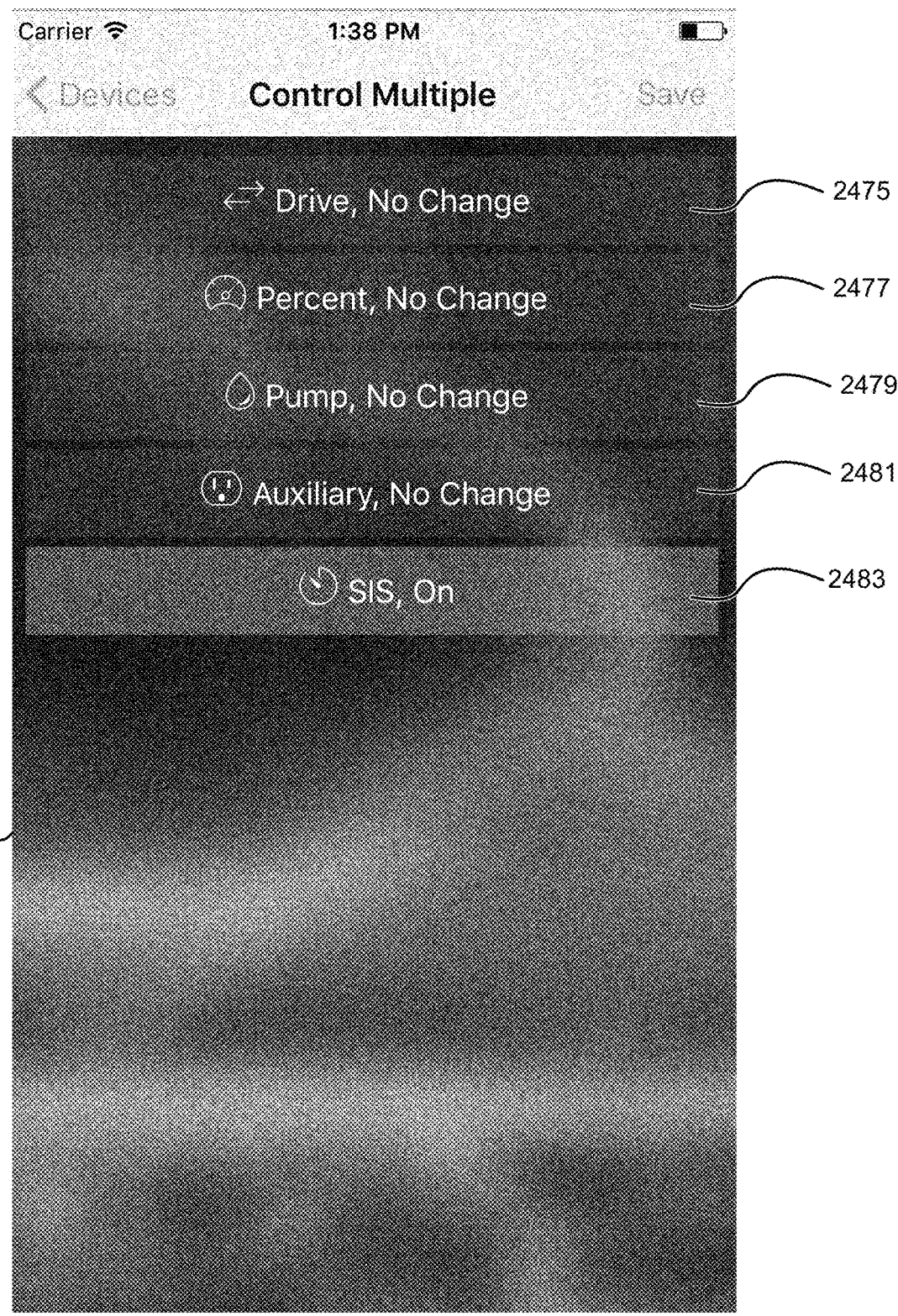
FIG. 24 is an example of a user interface for controlling multiple center pivot irrigation systems concurrently.

FIG. 24 is an example of a user interface 2473 for controlling multiple center pivot irrigation systems concurrently. For instance, multiple center pivot irrigation systems may be selected and controlled concurrently. For example, drive direction 2475, speed 2477, delivery 2479, auxiliary delivery 2481, and/or stop-in-slot 2483 may be activated for all of a set of center pivot irrigation systems.

Figure 25:
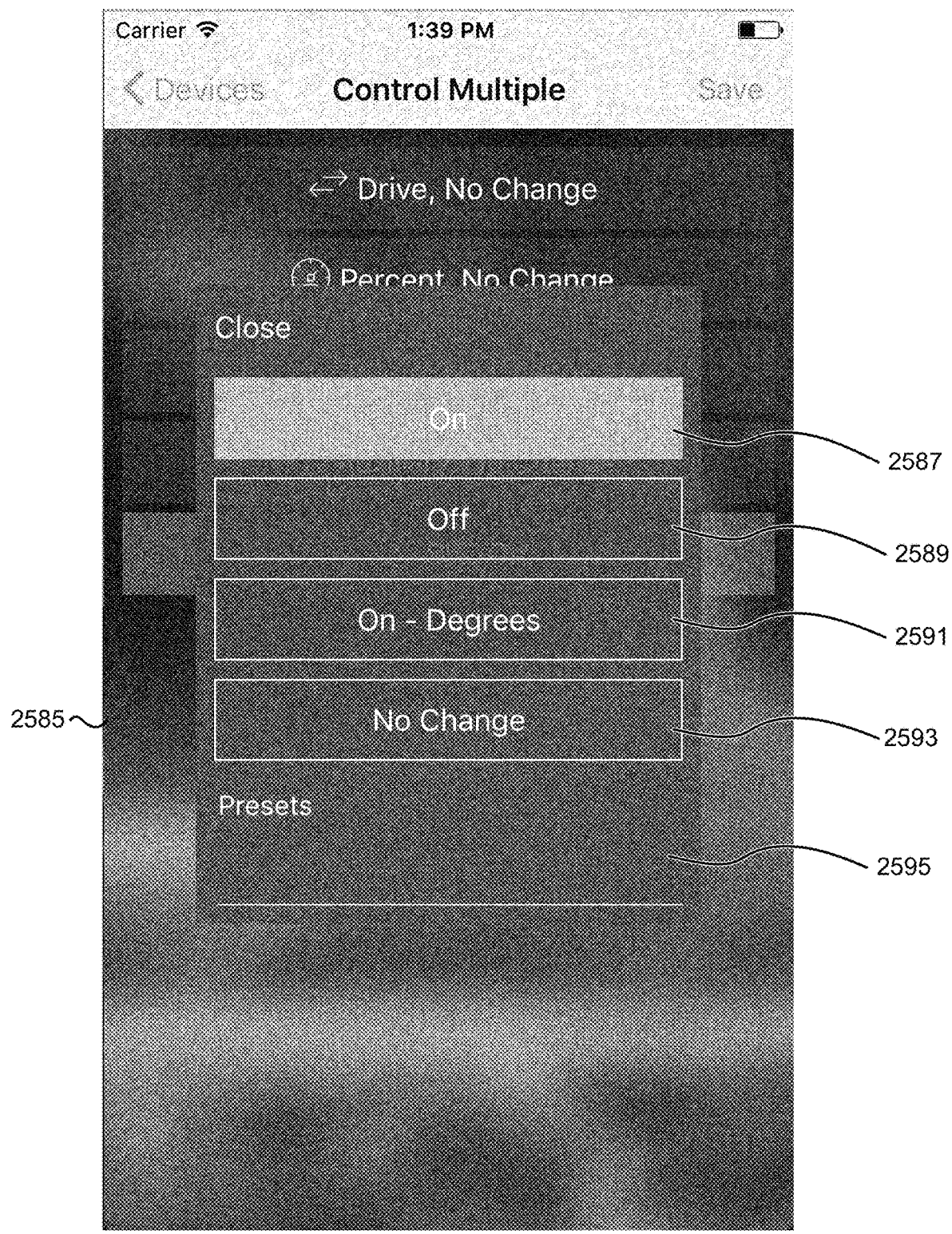
FIG. 25 is an example of a user interface when the stop-in-slot button is activated.

FIG. 25 is an example of a user interface 2585 when the stop-in-slot button is activated. Activating the stop-in-slot button may provide options for the stop-in-slot function. For example, options for activating stop-in-slot 2587, deactivating stop-in-slot 2589, activating stop-in-slot with a specified angle 2591, leaving stop-in-slot without changes 2593, and/or selecting a preset 2595 may be provided.

Figure 26:
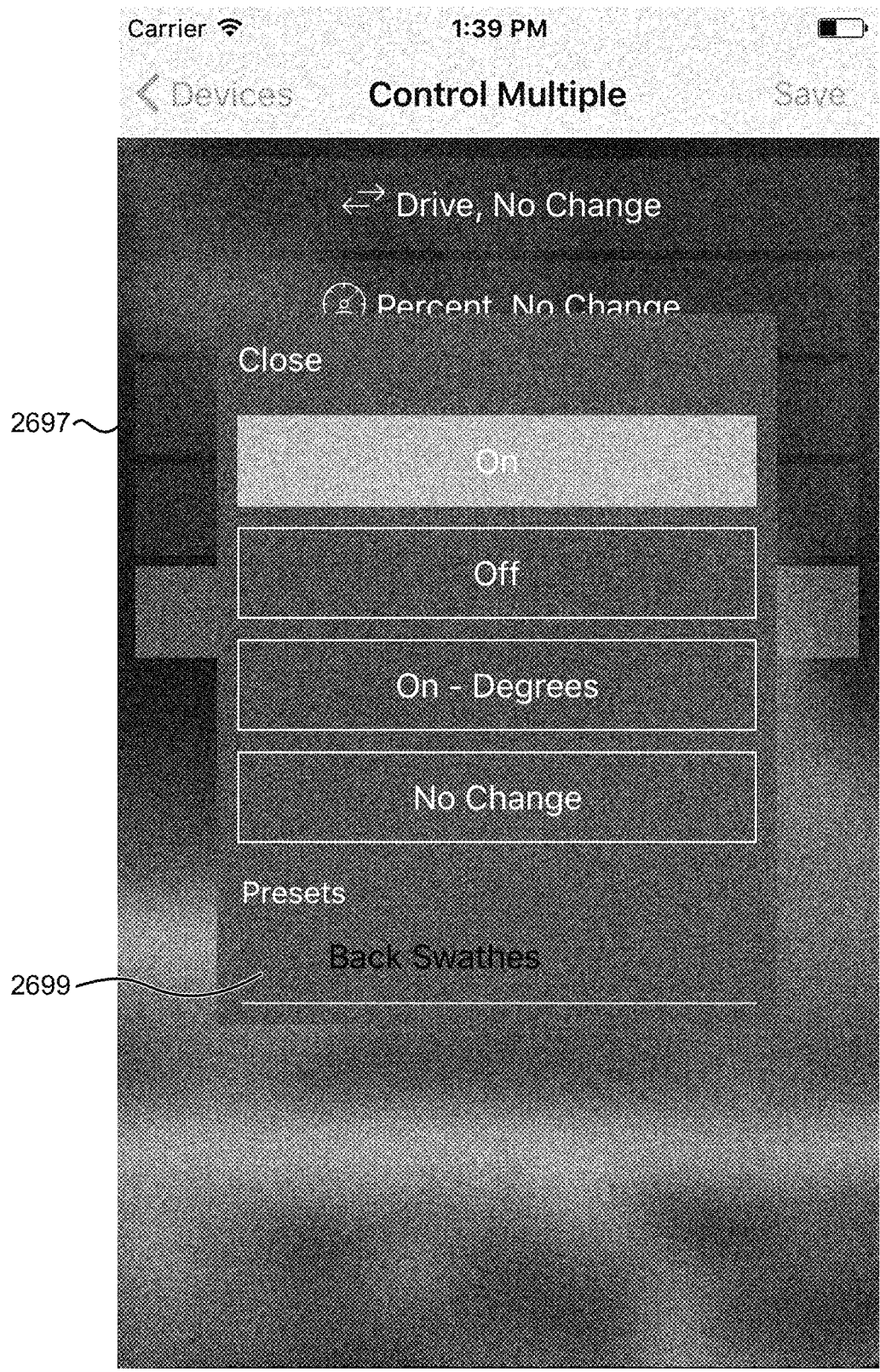
FIG. 26 is another example of a user interface when the stop-in-slot button is activated.

FIG. 26 is another example of a user interface 2697 when the stop-in-slot button is activated. In this example, a preset 2699 "Back Swathes" is selected. Accordingly, each selected center pivot irrigation system may control its corresponding pivot to a "Back Swathes" preset angle, which may be the same or different for each center pivot irrigation system.

Figure 27:
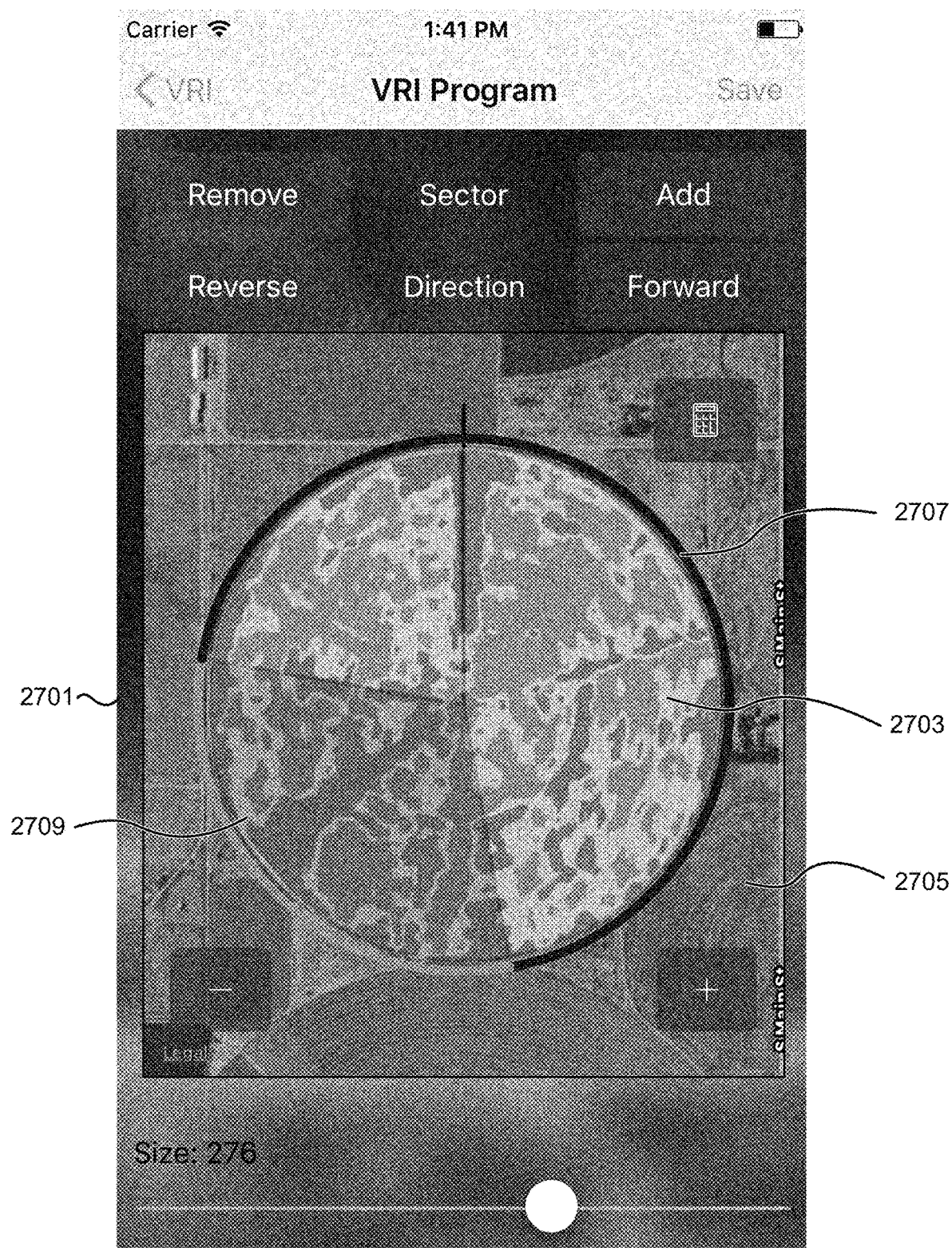
FIG. 27 is an example of a user interface with a photosynthesis map combined with map data and center pivot irrigation system information.

FIG. 27 is an example of a user interface 2701 with a photosynthesis map 2703 combined with map data 2705 and center pivot irrigation system information. The photosynthesis map 2703 may be utilized to show areas where photosynthesis is or is not occurring in the region covered by a center pivot irrigation system. Additionally or alternatively, a heat map may be utilized, which may show relatively hotter or cooler areas. The electronic device may provide a capability of programming different watering sectors to deliver more or less fluid. For example, more water may be provided in areas with less photosynthesis and/or relatively higher temperature. As can be observed, different color-coded areas 2709 (e.g., sectors) and/or arcs 2707 may be utilized to illustrate ranges in which different operations may be performed.

Figure 28:
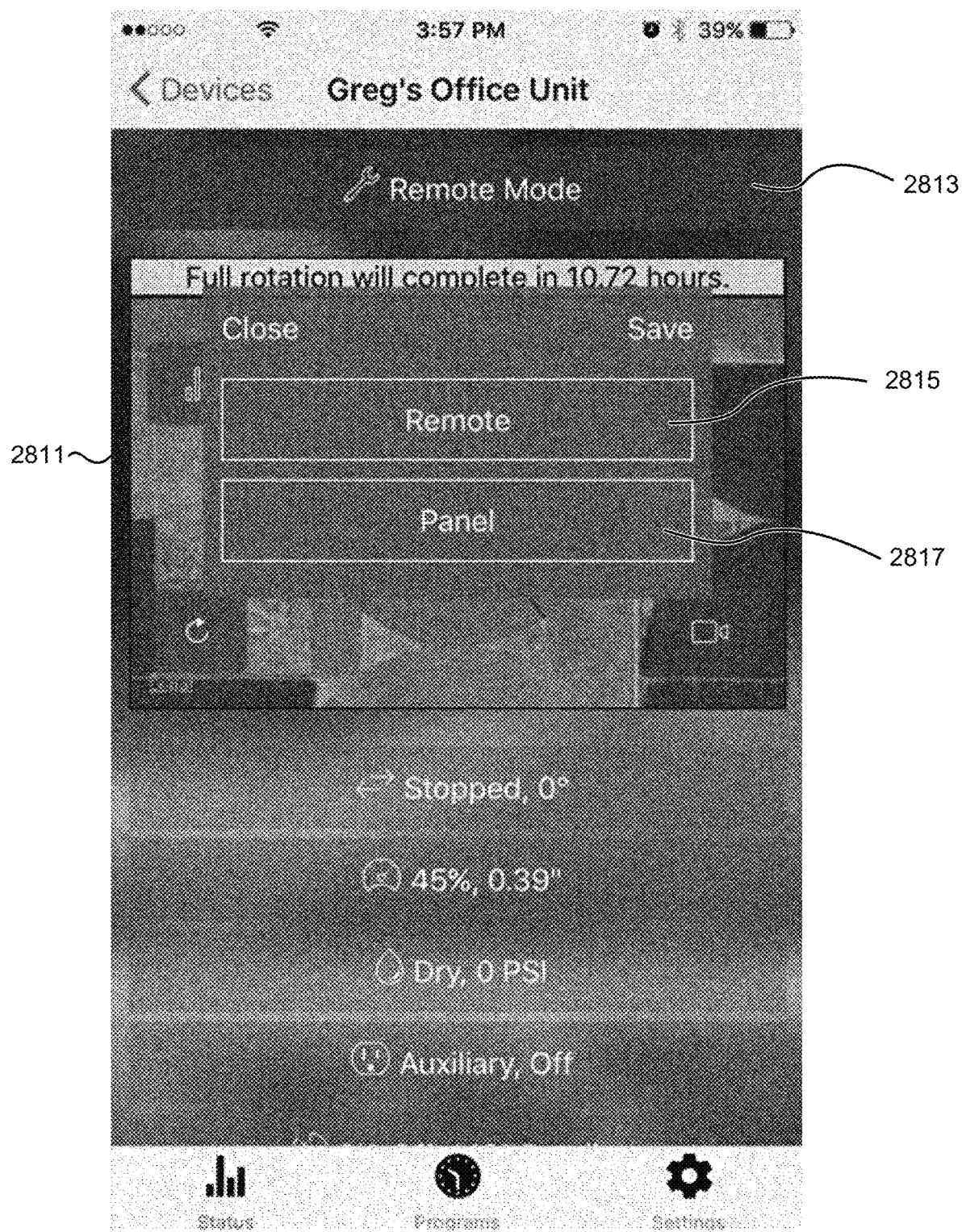
FIG. 28 is an example of a user interface when the mode button is activated.

FIG. 28 is an example of a user interface 2811 when the mode button 2813 is activated. For example, when the mode button is activated, options for remote control 2815 or panel control 2817 may be provided. This may allow for specification of a source of control. For instance, panel control 2817 may refer to a local panel on the center pivot irrigation system, and remote control 2815 may refer to remote control from the user interface (e.g., from a remote device).

Figure 29:
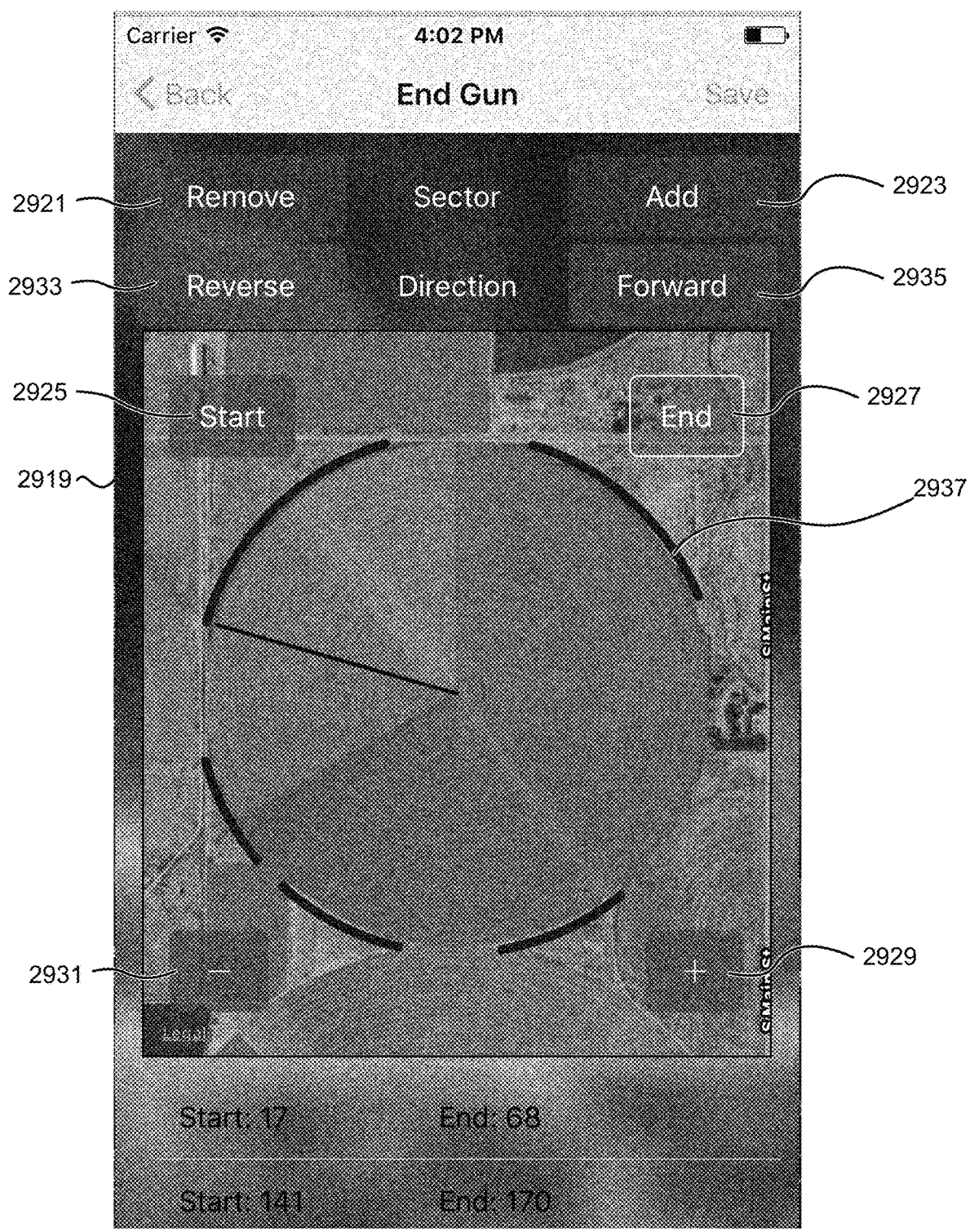
FIG. 29 is an example of a user interface for programming sectors for an end gun.

FIG. 29 is an example of a user interface 2919 for programming sectors for end gun operation. An end gun may be an irrigation structure (e.g., attachment) at the end of the pivot (i.e., the end of the pivot most remote from the center pivot). The end gun may be utilized to deliver fluid (e.g., water) to an area otherwise beyond the reach of the pivot (e.g., corner areas). The user interface 2919 may include a remove button 2921, an add button 2923, a start button 2925, an end button 2927, a plus button 2929, and/or a minus button 2931. A reverse button 2933 and a forward button 2935 are also provided. The user interface 2919 may enable programming sectors for an end gun.

The user interface 2919 may be utilized to set one or more sectors (e.g., angular ranges) in which the end gun may be activated (e.g., may deliver fluid). For example, when the add button 2923 is activated, a sector may be added. In various embodiments, the start button 2925 highlights when the add button 2923 is activated, and the user interface 2919 may then receive input indicating a starting angle for the sector. For example, a user may touch or click on a point on the diagram (e.g., map, circular shape) to set the starting angle. In various alternate embodiments, the start button 2925 may be activated after the add button 2923 has been activated in order to set a starting position for a sector. If the end button 2927 is thereafter activated, the user interface 2919 may receive input indicating an end angle for the sector. Once again, for example, a user may touch or click on a point on the diagram to set the end angle. Additionally or alternatively, if another sector is added, the starting angle for the additional sector may be set as the end angle for the previous sector in some approaches. The remove button 2921 may remove one or more selected sectors. As illustrated in FIG. 28, the diagram may include one or more arcs 2937 (e.g., outline ranges) to illustrate the sectors for end gun activation.

The plus button 2929 may be utilized to finely adjust a start or end angle for a sector. For example, after the add button 2923 or end button 2927 is activated and a starting or end angle is determined (based on received input, for instance), the plus button 2929 may be used to finely adjust the starting or end angle by adding an amount to the starting or end angle (e.g., 1 degree, 0.1 degrees or another amount). Similarly, the minus button 2931 may be utilized to finely adjust a start or end angle for a sector. For example, after the add button 2923 or end button 2927 is activated and a starting or end angle is determined (based on received input, for instance), the minus button 2931 may finely adjust the starting or end angle by subtracting an amount from the starting or end angle.

Figure 30:
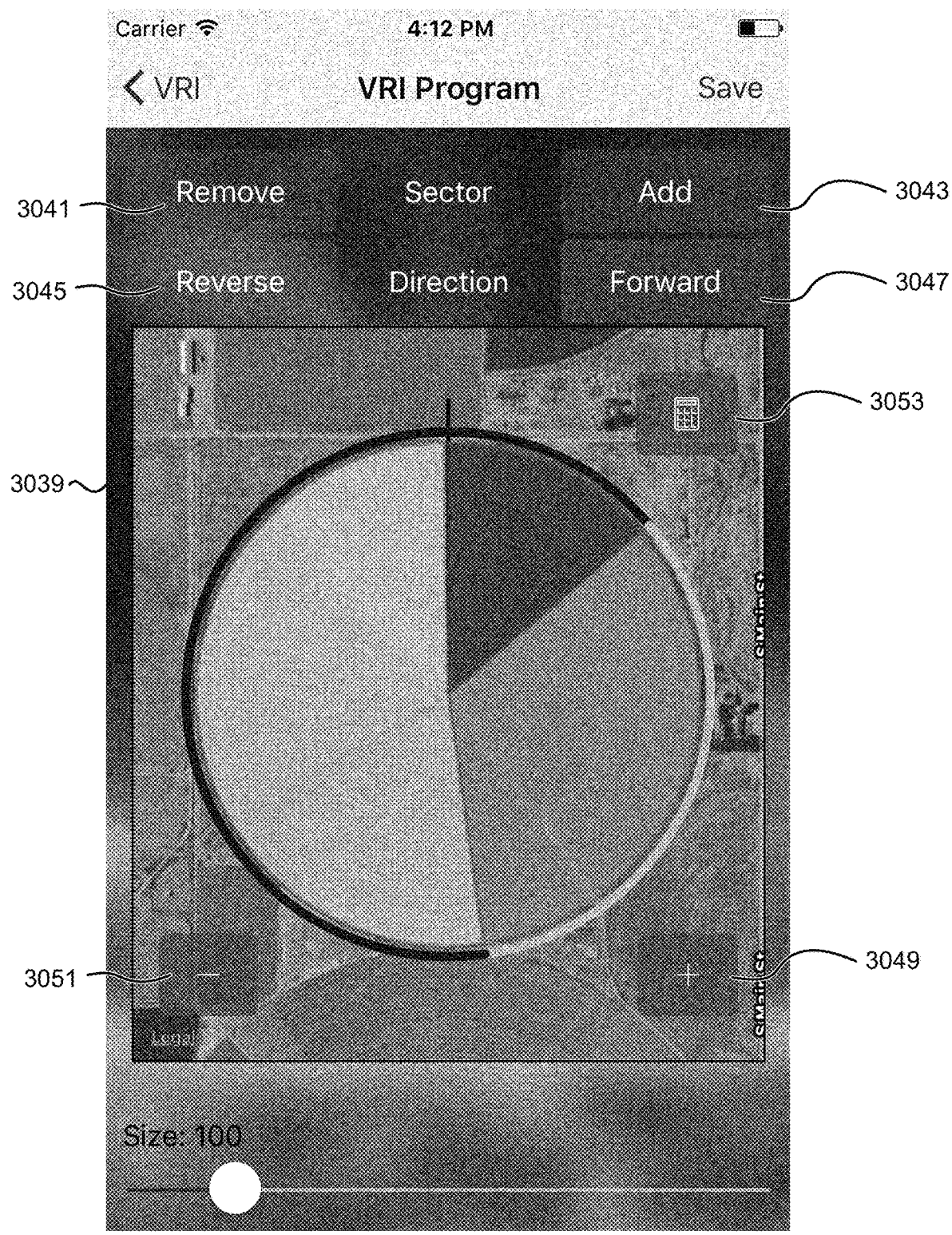
FIG. 30 is an example of a user interface for programming sectors for variable-rate irrigation.

FIG. 30 is an example of a user interface 3039 for programming sectors for variable-rate irrigation. The user interface 3039 may include a remove button 3041, an add button 3043, a reverse button 3045, a forward button 3047, a plus button 3049, a minus button 3051, and/or a keypad button 3053. The user interface 3039 may enable programming sectors for variable fluid delivery. For example, different amounts of fluid may be programmed to be delivered to different sectors. In various embodiments, a separate speed (and/or pressure) may be set for each sector. It should be noted that, in various embodiments, the slower the pivot moves, the more water will be delivered to a particular sector.

The user interface 3039 may be utilized to set one or more sectors (e.g., angular ranges) for fluid delivery (e.g., variable fluid delivery). For example, when the add button 3043 is activated, a sector may be added. The user interface 3039 may receive one or more inputs indicating a starting angle (and/or an end angle) for the sector. For example, a user may touch or click on a point on the diagram to set the starting angle (or an end angle). Additionally or alternatively, if another sector is added, the starting angle for the additional sector may be set as the end angle for the previous sector. In various embodiments, for example, the starting angle for a next sector may be the end angle for the last sector. In various embodiments, only a subset of the area may be set for fluid delivery. Accordingly, the sectors (e.g., starting and/or end angles) may be limited to the subset for fluid delivery. The remove button 3041 may remove one or more selected sectors. As illustrated in FIG. 30, the diagram (e.g., map and/or circular shape) may include color-coding and/or shading for each sector. The color coding and/or shading may indicate a relative amount of fluid delivery. For example, a darker shade may indicate more fluid delivery (e.g., slower pivot motion and/or increased fluid pressure), while a lighter shade may indicate less fluid delivery (e.g., faster pivot motion and/or decreased fluid pressure). The keypad button 3053 may open a keypad for specifying a speed for one or more sectors. For example, keypad inputs may be received specifying a speed for a sector (from 1% to 100% of maximum speed, for instance).

The plus button 3049 may be utilized to finely adjust a start or end angle for a sector. For example, the plus button 3049 may finely adjust the starting or end angle by adding an amount to the starting or end angle (e.g., 1 degree or another amount). Similarly, the minus button 3051 may be utilized to finely adjust a start or end angle for a sector. For example, the minus button 3051 may finely adjust the starting or end angle by subtracting an amount from the starting or end angle. The forward button 3047 and/or reverse button 3045 may be utilized to set whether the center pivot irrigation system will operate in forward or reverse for one or more of the sectors. In various embodiments, one or more other controls and/or labels may be included in the user interface 3039. For example, a list of set sectors may be presented with corresponding angular ranges. It should be noted that the electronic device may determine and/or communicate instructions for the sector programming with one or more center pivot irrigation systems. The center pivot irrigation system(s) may execute the instructions.

In various embodiments, additional data may be overlaid on or behind the diagram. For example, a photosynthesis map and/or a heat map may be overlaid on the diagram to enable programming based on levels of photosynthesis by area and/or based on temperature by area.

Figure 31:
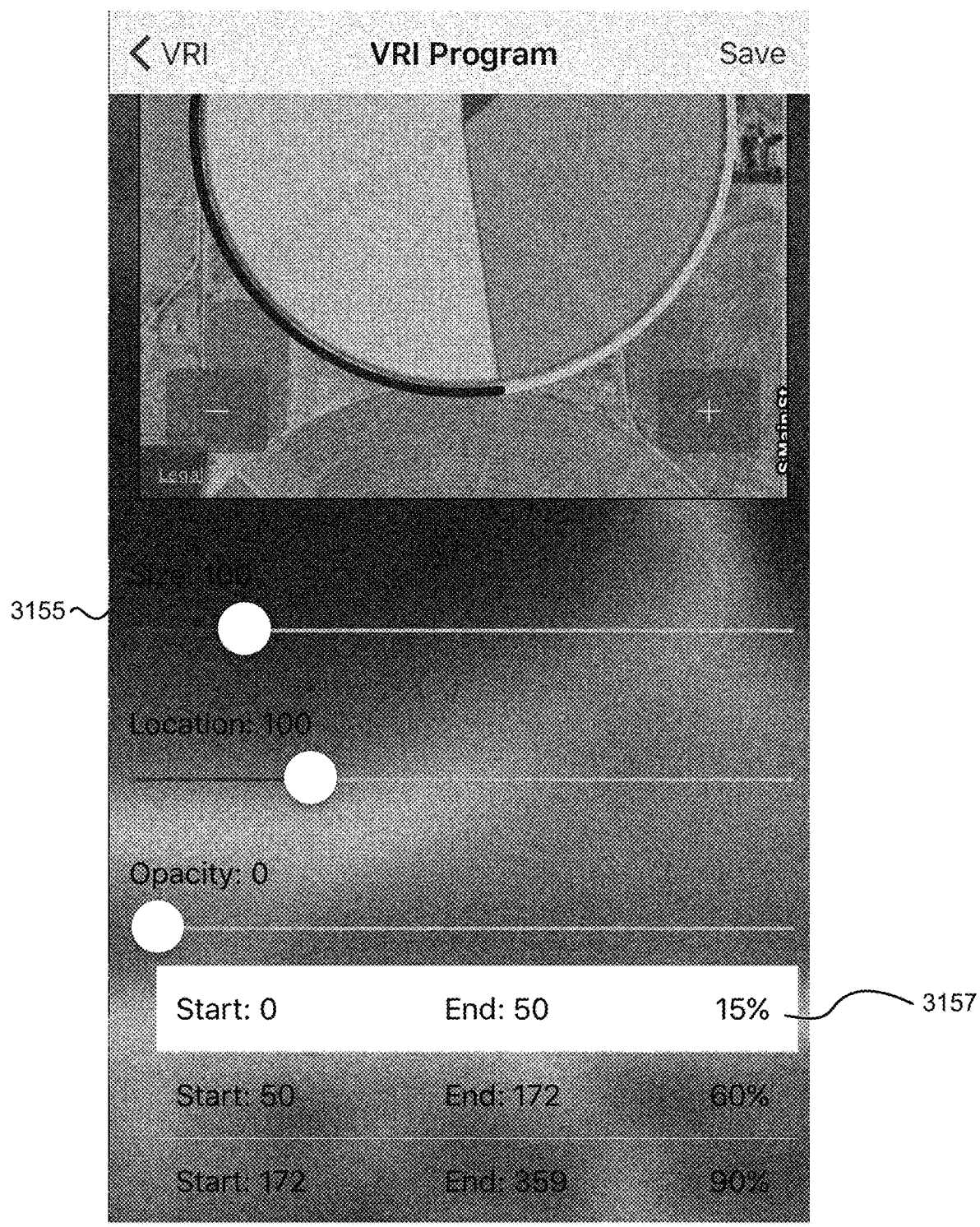
FIG. 31 is another example of a user interface for programming sectors.

FIG. 31 is another example of a user interface 3155 for programming sectors. In particular, FIG. 31 shows an example of additional content that may be included in the user interface 3039 described in connection with FIG. 30 (in an area below the diagram, for instance). In particular, FIG. 31 illustrates a list or table of sectors 3157 for variable-rate irrigation with corresponding angular ranges. A percentage of speed may also be presented. In various embodiments, each entry in the list of sectors may comprise a selectable control that may be utilized to select a sector when a corresponding input is received. Additionally or alternatively, a sector may be selected when an input is received corresponding to one or more sectors on the sector diagram.

One or more of the functions described in connection with one or more of FIGS. 11-31 may be implemented by the electronic device 324 described in connection with FIG. 3. For example, one or more of the user interfaces described in connection with one or more of FIGS. 11-31 may be examples of the user interface 342 described in connection with FIG. 3. For instance, when one or more of the options (e.g., interface controls) are utilized, the electronic device may generate one or more corresponding instructions for one or more center pivot irrigation systems. The instruction(s) may be sent to the one or more center pivot irrigation systems, which may execute the instruction(s). For example, one or more of the user interfaces described herein may be utilized to specify pivot motion, direction, fluid delivery, stop-in-slot, preset stop angle, auxiliary delivery, speed, sector programming, and/or end gun sector programming, etc.

Figure 32:
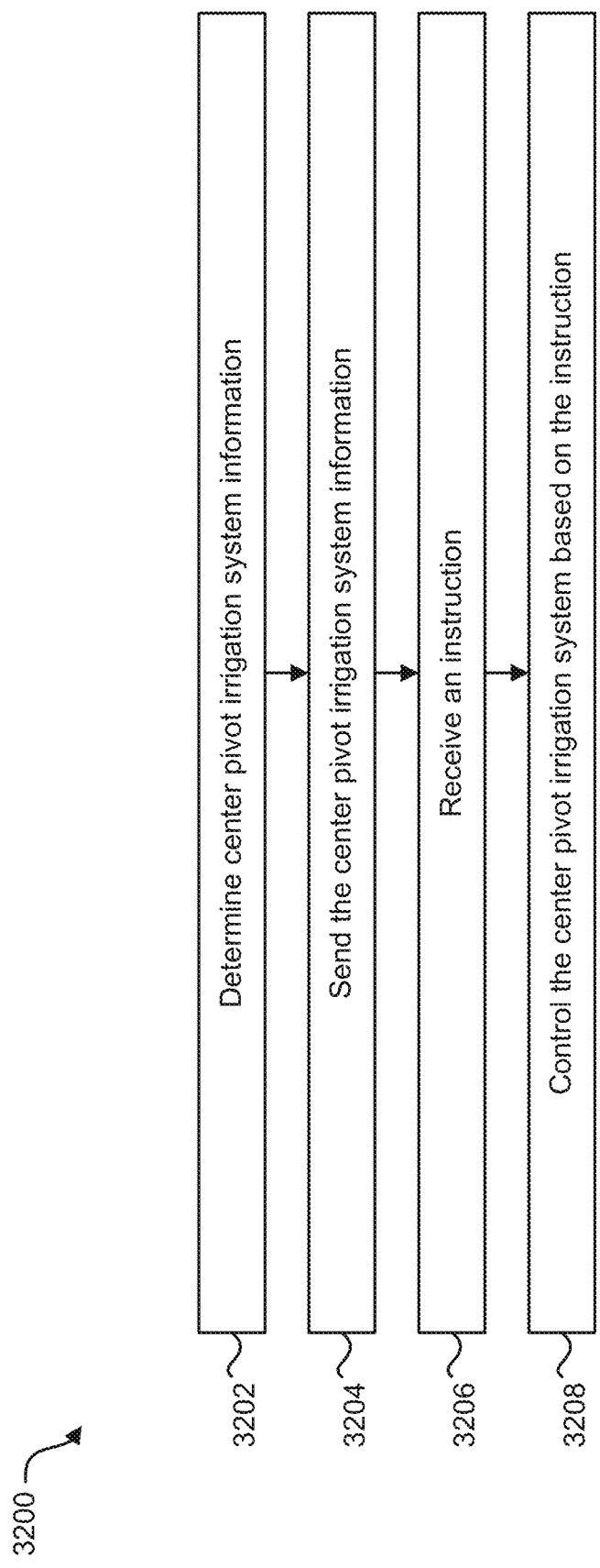
FIG. 32 is a flow diagram illustrating one configuration of a method for controlling a center pivot irrigation system.

FIG. 32 is a flow diagram illustrating one configuration of a method 3200 for controlling a center pivot irrigation system. The method 3200 may be performed by the center pivot irrigation system 100 (e.g., the control device 108, 212) described in connection with one or more of FIGS. 1-2 or another center pivot irrigation system and/or control device. The center pivot irrigation system may determine 3202 center pivot irrigation system information. This may be accomplished as described in connection with one or more of FIGS. 1-2. For example, the control device may maintain information (in memory, for instance) based on the current operating state of the center pivot irrigation system. Additionally or alternatively, the control device may utilize one or more sensors to determine one or more aspects of the information (e.g., valve sensors to determine whether fluid is being delivered, one or more sensors to determine pivot angle, pressure sensors to determine fluid pressure).

The center pivot irrigation system may send 3204 the center pivot irrigation system information. This may be accomplished as described in connection with one or more of FIGS. 1-2. For example, the control device may send the information to one or more remote devices using a wired and/or wireless link.

The center pivot irrigation system may receive 3206 one or more instructions. This may be accomplished as described in connection with one or more of FIGS. 1-2. For example, the control device may receive one or more instructions from one or more remote devices using a wired and/or wireless link.

The center pivot irrigation system may control 3208 the center pivot irrigation system based on the instruction(s). This may be accomplished as described in connection with one or more of FIGS. 1-3. For example, the control device may execute the instruction(s) to control the center pivot irrigation system.

Figure 33:
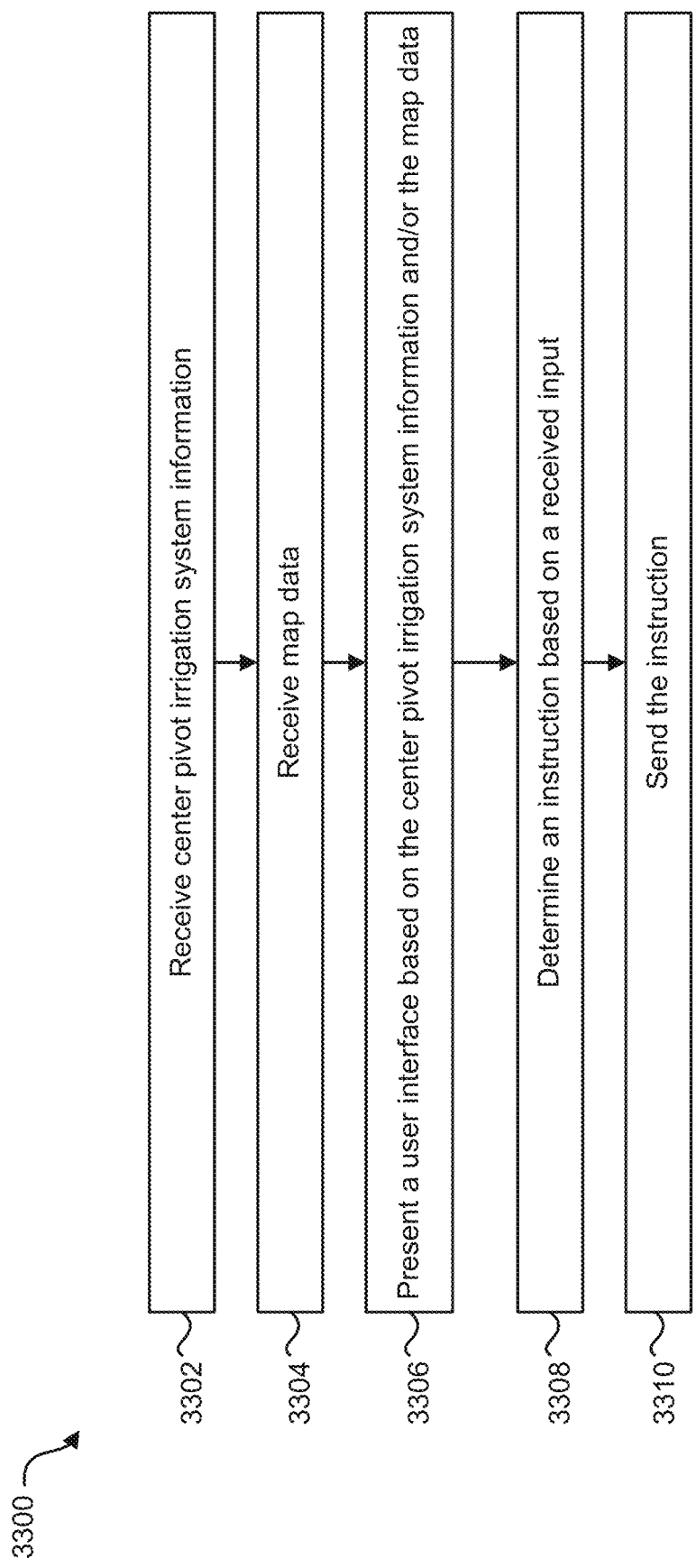
FIG. 33 is a flow diagram illustrating one configuration of a method for controlling a center pivot irrigation system.

FIG. 33 is a flow diagram illustrating one configuration of a method 3300 for controlling a center pivot irrigation system. The method 3300 may be performed by the electronic device 324 (e.g., remote device) described in connection with one or more of FIGS. 1 and 3 or another electronic device. The electronic device may receive 3302 center pivot irrigation system information. This may be accomplished as described in connection with FIG. 3. For example, the electronic device may receive information using a wired and/or wireless link.

The electronic device may receive 3304 map data. For example, the electronic device may receive map data from one or more sources. For instance, the electronic device may request and/or receive satellite photos and/or photosynthesis maps corresponding to an area where one or more center pivot irrigation systems are located. In some approaches, the electronic device may request map data based on GPS data from one or more center pivot irrigation systems. The map data may be requested and/or received 3304 from one or more devices on a network (e.g., map servers on the Internet).

The electronic device may present 3306 a user interface based on the center pivot irrigation system information and/or the map data. This may be accomplished as described in connection with FIG. 3. For example, the electronic device may combine map data with one or more aspects of the information to produce a user interface.

The electronic device may determine 3308 one or more instructions based on a received input. This may be accomplished as described in connection with FIG. 3. For example, the electronic device may generate one or more instructions to control one or more center pivot irrigation systems in accordance with the received input.

The electronic device may send 3310 the instruction(s). This may be accomplished as described in connection with FIG. 3. For example, the electronic device may send the instruction(s) via a wired and/or wireless link.

Figure 34:
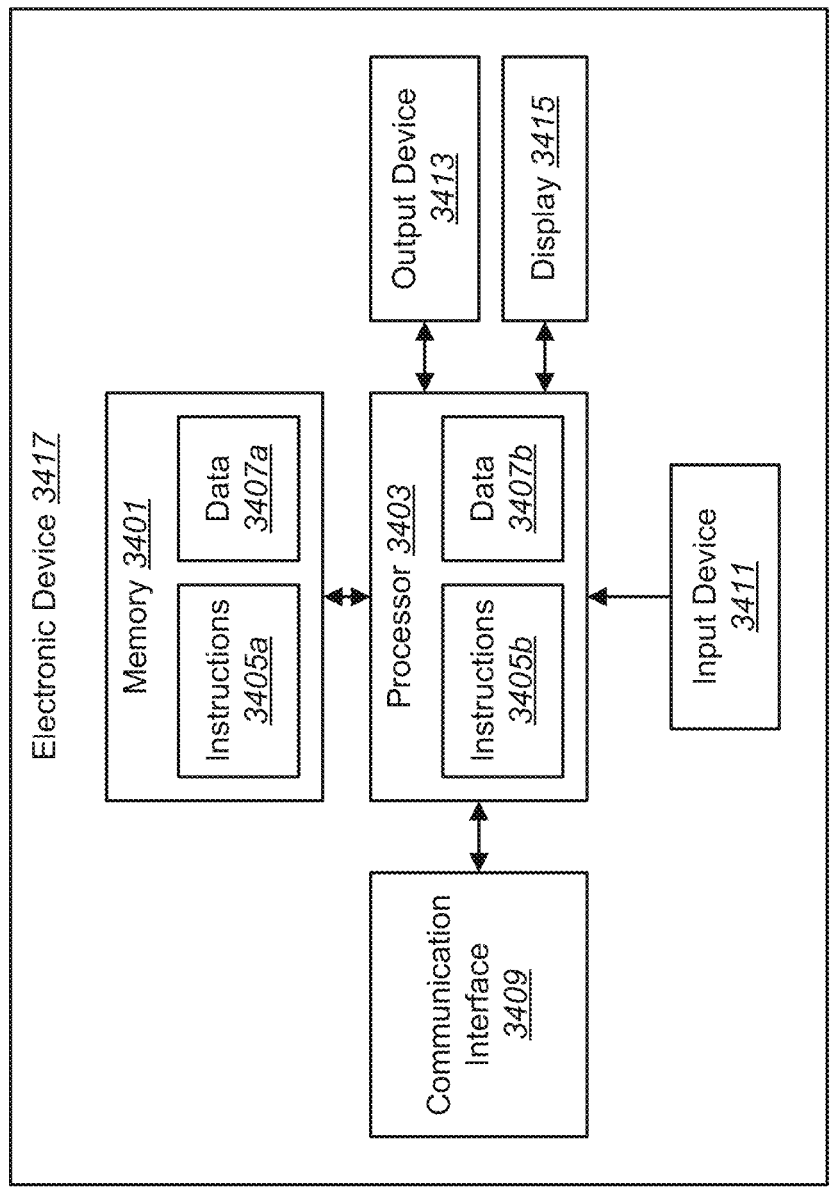
FIG. 34 illustrates various components that may be utilized in an electronic device.

FIG. 34 illustrates various components that may be utilized in an electronic device 3417. The electronic device 3417 described in connection with FIG. 34 may be configured in accordance with one or more of the devices described herein. For example, the electronic device 3417 may be configured to perform one or more of the methods 400, 500, 3200, 3300 described above. The electronic device 3417 may include a memory 3401, a communication interface 3409, an input device 3411 (e.g., a microphone, a touchscreen, or a button), a processor 3403, an output device 3413 (e.g., an audio speaker), a display 3415, and/or a display controller (not shown in FIG. 34). The memory 3401 may store instructions 3405a and data 3407a. The processor 3403 may operate on instructions 3405b and data 3407b. Additionally or alternatively, some embodiments of the electronic device 3417 may include a button interface (e.g., an input device 3411). It should not be noted that more of the components illustrated in FIG. 34 may be omitted. For example, some embodiments of the electronic device 3417 may not have an output device 3413. Some embodiments of the electronic device 3417 may be controlled on a remote display device (e.g., a touch panel) with communication through a remote device. In various embodiments, the processor 3403 may be configured to control a center pivot irrigation system as described herein.

The term "discrete circuit" refers to an electronic circuit built out of discrete components. Examples of discrete components include resistors, capacitors, inductors, transformers, transistors, etc.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such embodiment.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configurations and components illustrated above. Various modifications, changes, and variations may be made in the arrangement, operation, and details of the systems, methods, and apparatus described herein without departing from the scope of the claims.

What is claimed is:

1. An electronic device, comprising:
    memory;
    at least one processor coupled to the memory, wherein the at least one processor is configured to:
        receive center pivot irrigation system information corresponding to a center pivot irrigation system, the center pivot irrigation system comprising a pivot center, an access road to access the pivot center, and a pivot, the pivot extending from the pivot center and comprising a plurality of irrigation sprinklers coupled to an irrigation line, the pivot configured to rotate about the pivot center through different radial positions relative to the pivot center;
        request map data based on the center pivot irrigation system information, the map data comprising one or more images including a location of the center pivot irrigation system;
        receive the map data;
        present a user interface with a map of the center pivot irrigation system based on the map data;
        receive an input via the user interface indicating an input point on the map of the user interface;
        render, on the map of the user interface, an alteration point marker at a first position aligned with the input point and a pivot center location depicted on the map, the alteration point marker representing an alteration point for the pivot, the alteration point corresponding to a first radial position of the pivot at which a change in operation of the pivot is set to occur;
        control the center pivot irrigation system to alter operation of the pivot at the first radial position;
        render a fine position control on the user interface, the fine position control comprising an increase control interface and a decrease control interface for incrementally repositioning the alteration point marker in a clockwise or counterclockwise direction with respect to the pivot center location depicted on the map in response to activation of the increase control interface or the decrease control interface;
        receive an adjustment input corresponding to the fine position control;
        adjust the alteration point based on the adjustment input; and
        render a button on the user interface, wherein in response to activation of the button, the pivot is repositioned to be situated at least partially within the access road for servicing.

2. The electronic device of claim 1, wherein the fine position control comprises the increase control interface and the decrease control interface for incrementally repositioning the alteration point marker in a clockwise or counterclockwise direction in sub-degree increments with respect to the pivot center location depicted on the map in response to activation of the increase control interface or the decrease control interface.

3. The electronic device of claim 1, wherein the at least one processor is configured to:
    determine a first coordinate of the input point on the map; and
    calculate the first radial position based on the first coordinate and a second coordinate of the pivot center location depicted on the map.

4. The electronic device of claim 1, wherein the at least one processor is configured to:
    receive an operation input indicating the change in operation via the user interface; and
    associate the alteration point with the change in operation.

5. The electronic device of claim 4, wherein the at least one processor is configured to control the center pivot irrigation system by commanding the center pivot irrigation system to execute the change in operation based on the alteration point.

6. The electronic device of claim 1, wherein the at least one processor is configured to:
    receive a second input via the user interface indicating a second input point on the map of the user interface; and
    determine a second alteration point based on the second input point and the center pivot irrigation system information.

7. The electronic device of claim 6, wherein the at least one processor is configured to control the center pivot irrigation system by commanding the center pivot irrigation system to execute the change in operation in a range between the alteration point and the second alteration point.

8. The electronic device of claim 1, wherein the at least one processor is configured to alter operation of the pivot at the first radial position by commanding the center pivot irrigation system to stop moving, to start moving, to activate an end gun, to deactivate an end gun, to change speed, to change direction, to supply auxiliary material, to stop supplying auxiliary material, to change auxiliary material supply, to activate liquid flow, or to deactivate liquid flow at the first radial position.

9. A non-transitory computer-readable medium storing computer executable code, comprising:
    code for causing an electronic device to receive center pivot irrigation system information from a center pivot irrigation system, the center pivot irrigation system comprising a pivot center, an access road to access the pivot center, and a pivot, the pivot extending from the pivot center and comprising a plurality of irrigation sprinklers coupled to an irrigation line, the pivot configured to rotate through different radial positions relative to the pivot center;
    code for causing the electronic device to request map data based on the center pivot irrigation system information, the map data comprising one or more images including a location of the center pivot irrigation system;
    code for causing the electronic device to receive the map data;
    code for causing the electronic device to present a user interface with a map of the center pivot irrigation system based on the map data;
    code for causing the electronic device to receive an input via the user interface indicating an input point on the map of the user interface;
    code for causing the electronic device to render, on the map of the user interface, an alteration point marker at a first position aligned with the input point and a pivot center location depicted the map, the alteration point marker representing an alteration point for the pivot, the alteration point corresponding to a first radial position of the pivot at which a change in operation of the pivot is set to occur;
    code for causing the electronic device to control the center pivot irrigation system to alter operation of the pivot at the first radial position;
    code for causing the electronic device to render a fine position control on the user interface, the fine position control comprising an increase control interface and a decrease control interface for incrementally repositioning the alteration point marker in a clockwise or counterclockwise direction with respect to the pivot center location depicted on the map in response to activation of the increase control interface or the decrease control interface;
    code for causing the electronic device to receive an adjustment input corresponding to the fine position control;
    code for causing the electronic device to adjust the alteration point based on the adjustment input; and
    code for causing the electronic device to render a button on the user interface, wherein in response to activation of the button, the pivot is repositioned to be situated at least partially within the access road for servicing.

10. The computer-readable medium of claim 9, wherein the fine position control comprises the increase control interface and the decrease control interface for incrementally repositioning the alteration point marker in a clockwise or counterclockwise direction in sub-degree increments with respect to the pivot center location depicted on the map in response to activation of the increase control interface or the decrease control interface.

11. The computer-readable medium of claim 9, further comprising:
    code for causing the electronic device to determine a first coordinate of the input point on the map; and
    code for causing the electronic device to calculate the first radial position based on the first coordinate and a second coordinate of the pivot center location depicted on the map.

12. The computer-readable medium of claim 9, further comprising:
    code for causing the electronic device to receive an operation input indicating the change in operation via the user interface; and
    code for causing the electronic device to associate the alteration point with the change in operation.

13. The computer-readable medium of claim 12, further comprising code for causing the electronic device to control the center pivot irrigation system by commanding the center pivot irrigation system to execute the change in operation based on the alteration point.

14. The computer-readable medium of claim 9, further comprising code for causing the electronic device to render, on the map of the user interface, an indicator of a pivot angle of the center pivot irrigation system based on the center pivot irrigation system information.

15. A non-transitory computer-readable medium storing computer executable code, comprising:
    code for causing an electronic device to receive center pivot irrigation system information from a first server, a center pivot irrigation system comprising a pivot center, an access road to access the pivot center, and a pivot, the pivot extending from the pivot center and comprising a plurality of irrigation sprinklers coupled to an irrigation line, the pivot configured to rotate through different radial positions relative to the pivot center;
    code for causing the electronic device to request map data from a second server based on the center pivot irrigation system information, the map data comprising one or more images including a location of the center pivot irrigation system;
    code for causing the electronic device to receive the map data from the second server;
    code for causing the electronic device to present, on a display, a user interface with a map of the center pivot irrigation system based on the map data;
    code for causing the electronic device to render, on the display, an indicator of a current radial position of the pivot on the map of the user interface;
    code for causing the electronic device to receive, via the user interface, an operation input indicating a change in operation;
    code for causing the electronic device to receive an input via the user interface indicating an input point on the map of the user interface;
    code for causing the electronic device to render, on the map of the user interface, an alteration point marker at a first position aligned with the input point and a pivot center location depicted on the map, the alteration point marker representing an alteration point for the pivot, the alteration point corresponding to a first radial position of the pivot at which the change in operation of the pivot is set to occur;

code for causing the electronic device to build a command table based on the change in operation and the alteration point;

code for causing the electronic device to control the center pivot irrigation system based on the command table;

code for causing the electronic device to render a fine position control on the user interface, the fine position control comprising an increase control interface and a decrease control interface for incrementally repositioning the alteration point marker in a clockwise or counterclockwise direction with respect to the pivot center location depicted on the map in response to activation of the increase control interface or the decrease control interface;

code for causing the electronic device to receive an adjustment input corresponding to the fine position control;

code for causing the electronic device to adjust the alteration point based on the adjustment input; and code for causing the electronic device to render a button on the user interface, wherein in response to activation of the button, the pivot is repositioned to be situated at least partially within the access road for servicing.

16. The computer-readable medium of claim 15, wherein the fine position control comprises the increase control interface and the decrease control interface for incrementally repositioning the alteration point marker in a clockwise or counterclockwise direction in sub-degree increments with respect to the pivot center location depicted on the map in response to activation of the increase control interface or the decrease control interface.

17. The computer-readable medium of claim 15, further comprising:

code for causing the electronic device to receive a second input via the user interface indicating a second input point on the map of the user interface; and code for causing the electronic device to render, on the display, an arc between the alteration point marker and a second alteration point marker at a second position aligned with the second input point and the location of the pivot center, wherein the arc indicates a range of the change in operation.

18. The computer-readable medium of claim 17, further comprising:

code for causing the electronic device to render, on the display, a plurality of color-coded arcs corresponding to a plurality of center pivot irrigation system operations.

19. The computer-readable medium of claim 15, further comprising:

code for causing the electronic device to display a set of thumbnail icons corresponding to a set of center pivot irrigation systems including the center pivot irrigation system; and code for causing the electronic device to receive a selection input selecting the center pivot irrigation system, wherein the code for causing the electronic device to present the user interface with the map of the center pivot irrigation system based on the map data is based on the selection input.

* * * * *

UNITED STATES PATENT AND TRADEMARK OFFICE
CERTIFICATE OF CORRECTION

PATENT NO. : 10,893,650 B1  
APPLICATION NO. : 16/183235  
DATED : January 19, 2021  
INVENTOR(S) : Jason R. Sims, James G. Stewart, II and Brad J. Wardle Page 1 of 1

It is certified that error appears in the above-identified patent and that said Letters Patent is hereby corrected as shown below:

In the Claims

In Column 33, Line 42 (Claim 9), after "depicted" and before "the map" insert --on--

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*